United States Patent
Ohno et al.

[11] Patent Number: 5,828,634
[45] Date of Patent: Oct. 27, 1998

[54] OPTICAL DISK TRACKING METHOD AND DEVICE FOR PRODUCING A TRACKING ERROR SIGNAL AND A TRACK CROSSING SIGNAL

[75] Inventors: Takehide Ohno; Hiroshi Maegawa, both of Yokohama, Japan

[73] Assignee: Ricoh Company, Ltd., Japan

[21] Appl. No.: 808,986

[22] Filed: Feb. 20, 1997

[30] Foreign Application Priority Data

Feb. 22, 1996 [JP] Japan .................................. 8-034741
May 16, 1996 [JP] Japan .................................. 8-121178
Jun. 14, 1996 [JP] Japan .................................. 8-153600

[51] Int. Cl.$^6$ ..................................... G11B 7/00
[52] U.S. Cl. .................................. 369/44.26; 369/44.41; 369/44.28; 369/110; 369/44.34
[58] Field of Search ........................... 369/44.41, 44.42, 369/44.26, 44.27, 44.34, 44.28, 44.29, 44.37, 110

[56] References Cited

U.S. PATENT DOCUMENTS

| | | | |
|---|---|---|---|
| 5,440,535 | 8/1995 | Takagi et al. | 369/44.28 |
| 5,594,711 | 1/1997 | Koyama | 369/44.28 |
| 5,638,350 | 6/1997 | Fuji | 369/44.28 |
| 5,671,199 | 9/1997 | Nishikawa | 369/44.37 |

FOREIGN PATENT DOCUMENTS

| | | |
|---|---|---|
| 4-34212 | 6/1992 | Japan . |
| 6-84172 | 3/1994 | Japan . |
| 6-203411 | 7/1994 | Japan . |

Primary Examiner—Nabil Hindi
Attorney, Agent, or Firm—Dickstein Shapiro Morin & Oshinsky LLP

[57] ABSTRACT

An optical disk device includes an optical system having a beam converting unit and an objective lens. The beam converting unit converts a beam of laser light emitted by a laser light source into a main beam and at least one sub-beam. The objective lens places a main spot on the disk by the main beam and at least one sub-spot on the disk by the sub-beam, such that, when the main spot is on a center line of one of lands and grooves of an optical disk, the sub-spot is between the center line of one of the lands and the grooves and a center line of an adjacent one of the lands and the grooves. A first unit produces a first push-pull signal from a reflection beam from the main spot on the disk. A second unit produces a second push-pull signal from a reflection beam from the sub-spot on the disk. A tracking error signal generating unit produces a tracking error signal based upon the first push-pull signal. A track crossing signal generating unit produces a track crossing signal based upon the second push-pull signal.

20 Claims, 17 Drawing Sheets

FIG.5 PRIOR ART
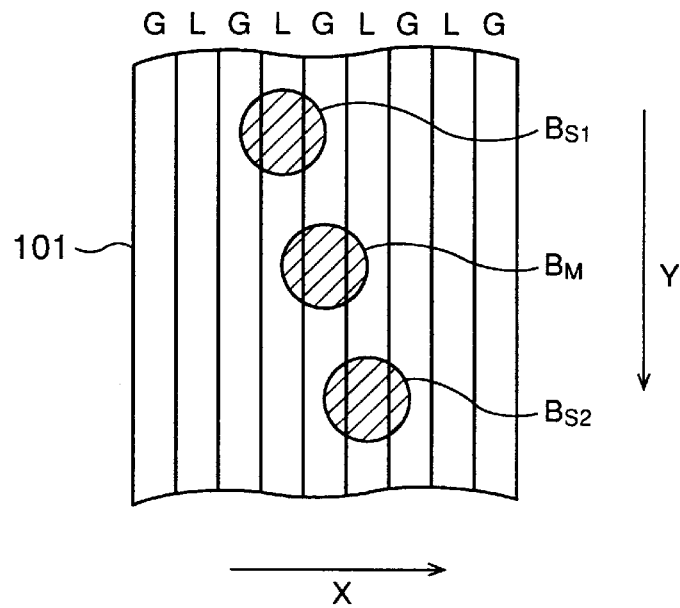
FIG.6A PRIOR ART
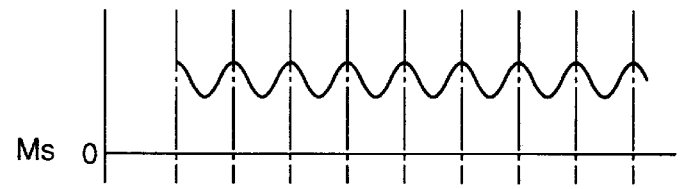
Ms
FIG.6B PRIOR ART
S1s
FIG.6C PRIOR ART
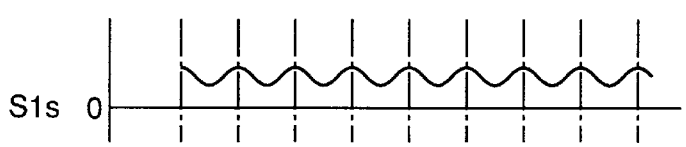
S2s
FIG.6D PRIOR ART
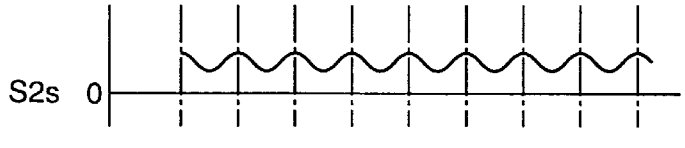
S1s+S2s
FIG.6E PRIOR ART
Ms-(S1s+S2s)

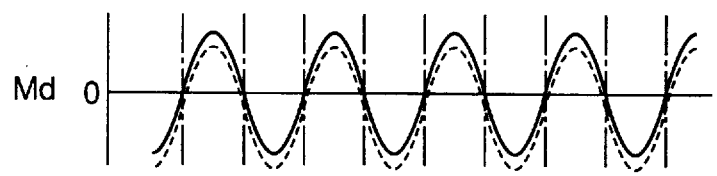
FIG.11A  Md
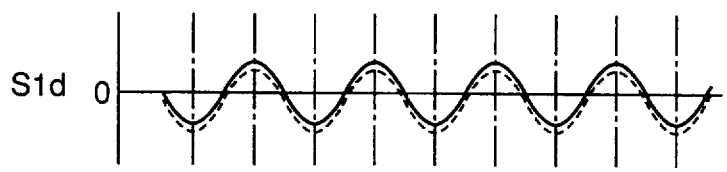
FIG.11B  S1d
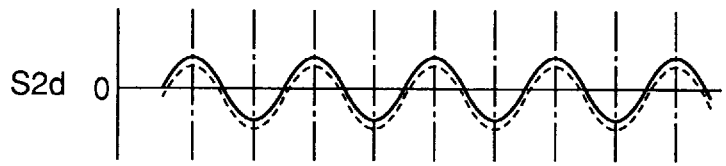
FIG.11C  S2d
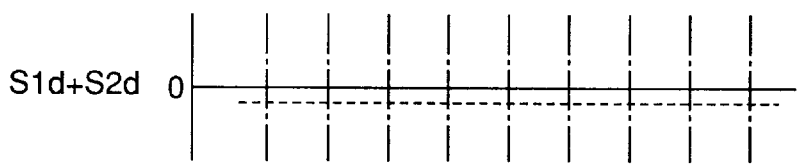
FIG.11D  S1d+S2d
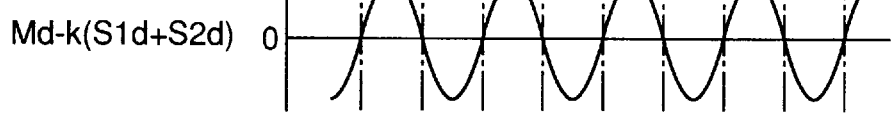
FIG.11E  Md−k(S1d+S2d)

FIG.14A  Md
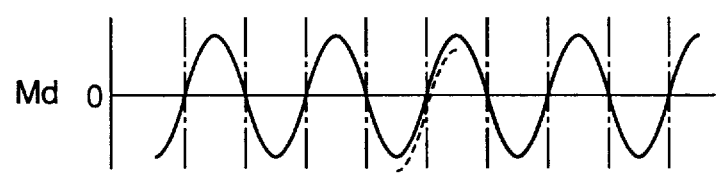
FIG.14B  S1d
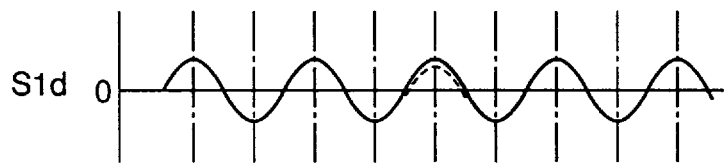
FIG.14C  S2d
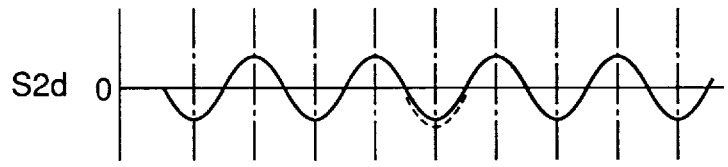
FIG.14D  S1d+S2d
FIG.14E  Md−k'(S1d+S2d)
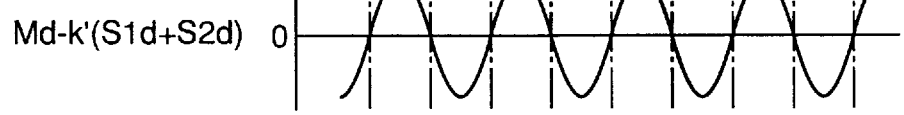

FIG.19A
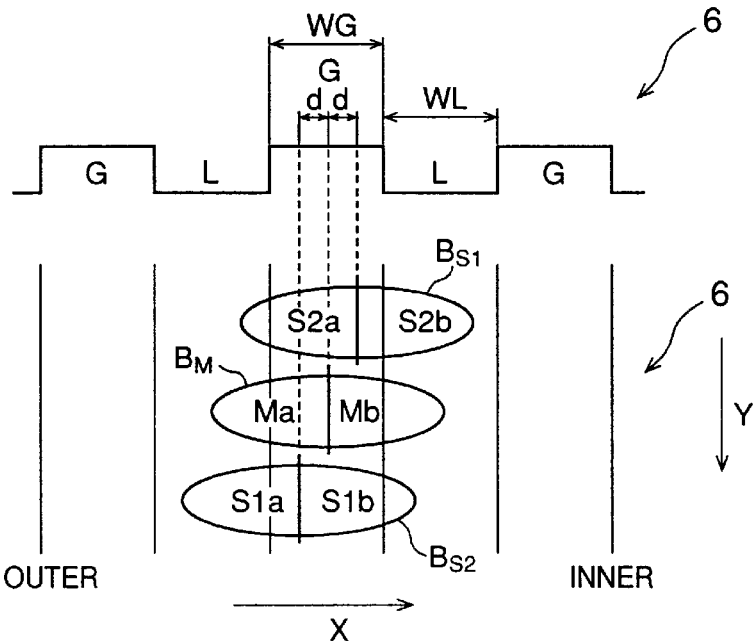
FIG.19B
FIG.19C
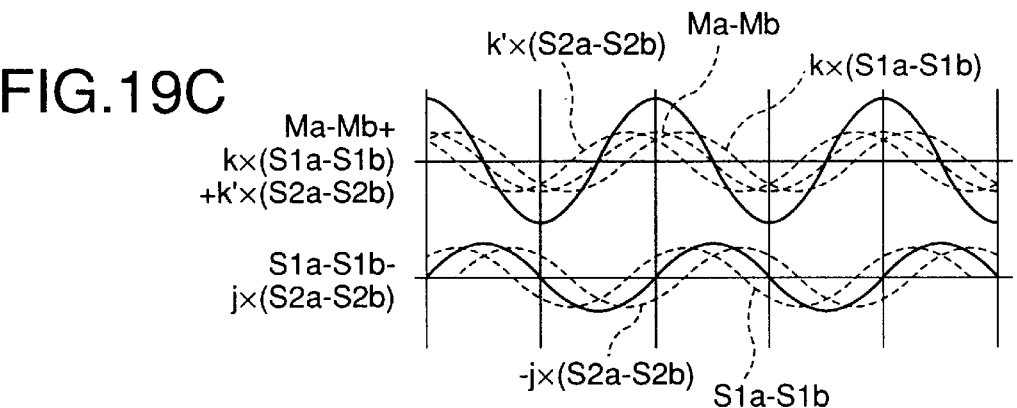
FIG.19D
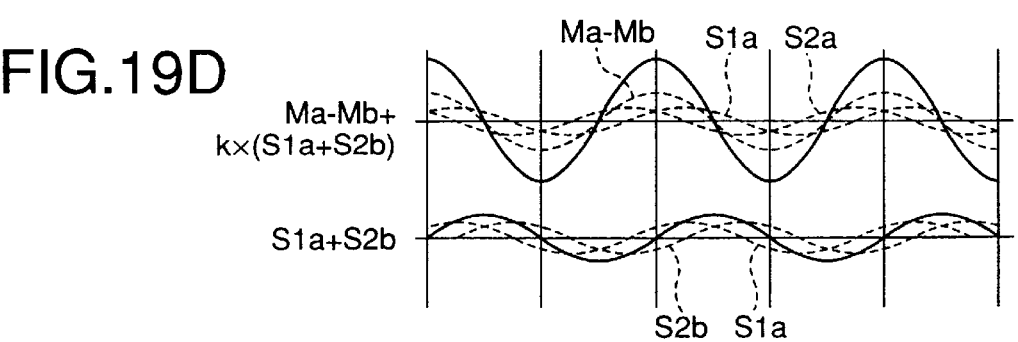

OPTICAL DISK TRACKING METHOD AND DEVICE FOR PRODUCING A TRACKING ERROR SIGNAL AND A TRACK CROSSING SIGNAL

BACKGROUND OF THE INVENTION (1) Field of the Invention

The present invention relates to a tracking method of an optical disk, and relates to an optical disk device for producing a tracking error signal and a track crossing signal based upon signals output by a photodetector, in order to carry out a tracking servo control of the optical disk.

(2) Description of the Related Art

Generally, it is necessary for an optical disk device to carry out a tracking servo control which allows a beam of emission light to be directed to a track of an optical disk at a desired position when recording, playing or erasing information on the optical disk. A tracking error is detected based on reflection beams from spots on the optical disk, and the tracking error is corrected to zero by the tracking servo control, so that the spots are placed to the exact position of the track of the optical disk.

When a tracking servo control or a track jump is carried out in order to record data onto or reproduce data from the optical disk, it is necessary that the optical disk device produce a tracking error signal and a track crossing signal. The tracking error signal, when it becomes zero, indicates that a spot is on the center line of one of tracks of the disk. The amplitude of the tracking error signal varies according to a distance between the spot and the center line of one of the tracks of the disk. The track crossing signal indicates whether the spot is on the center line of one of tracks of the disk or between two adjacent tracks of the disk.

FIGS. 1A and 1B show a tracking error signal produced when a spot crosses tracks of an optical disk. In FIGS. 1A and 1B, the positions of the center lines of the tracks are indicated by vertical one-dot chain lines.

As shown in FIG. 1A, suppose that a spot "P" of an optical disk device crosses the tracks "T" of the optical disk one by one. When the spot P crosses the tracks T one by one, the tracking error signal produced by the optical disk device varies in the form of a sine wave as shown in FIG. 1B.

As shown in FIGS. 1A and 1B, not only when the spot P is on the center line of one of the tracks T of the disk but also when the spot P is between two adjacent tracks T of the disk, the tracking error signal becomes zero. Thus, if it is detected at a certain time that the tracking error signal becomes zero, it cannot be determined whether the spot P is on the center line of one of the tracks T by using only the tracking error signal. In order to correctly determine that the spot P is on the center line of one of the tracks T, the tracking error signal and the track crossing signal are simultaneously used by the optical disk device. As described above, the track crossing signal indicates whether the spot is on the center line of one of tracks of the disk or between two adjacent tracks of the disk.

Generally, tracks of an optical disk are formed with alternate lands and grooves on the surface of the disk. A conventional optical disk device usually records data onto or reproduces data from ones of the lands and the grooves of the optical disk. Recently, there is a demand for increasing the amount of information recorded on an optical disk, and an optical disk device which records data onto or reproduces data from both lands and grooves of the optical disk has been proposed. For example, Japanese Laid-Open Patent Application No.6-84172 ("Koukai") discloses such an optical disk device.

In order to carry out the tracking servo control with the optical disk by the optical disk device of the above publication, it is necessary that the polarity of the tracking error signal be inverted when the spot crosses one of the lands of the disk as well as when the spot crosses one of the grooves of the disk. Thus, it is important that the optical disk device of the above publication produce a stable track crossing signal and a stable tracking error signal at the same time.

A differential push-pull method which obtains a tracking error signal and a track crossing signal by an optical disk device for recording data onto or reproducing data from ones of the lands and the grooves of the optical disk, the lands and the grooves having different radial widths, is known. For example, Japanese Published Patent Application No.4-34212 ("Koukoku") discloses such a differential push-pull method of tracking error detection.

In the differential push-pull method of the above-mentioned publication, the tracking error signal and the track crossing signal are obtained by an optical disk device which records data onto or reproduces data from only the grooves of an optical disk, a radial width of the grooves of the optical disk being smaller than a radial width of the lands (such as lands and grooves of a CD-R (Compact Disk-Recordable)).

The differential push-pull method of the above-mentioned publication is a conventional three-beam method. FIG. 2 shows a positional relationship between spots of a conventional optical disk device and tracks of an optical disk 100, which is used by the above differential push-pull method. In FIG. 2, a radial direction (i.e. a track crossing direction) of the optical disk 100 is indicated by the arrow "X", and a tangential direction (i.e. a disk rotating direction) of the optical disk 100 is indicated by the arrow "Y".

As shown in FIG. 2, the tracks of the optical disk 100 are formed with alternate lands "L" and grooves "G" on the surface of the disk 100, the grooves G having a radial width smaller than a radial width of the lands L. In the optical disk 100, data is recorded onto and reproduced from the grooves G only. A main spot Bm and a pair of sub-spots Bs1 and Bs2 are arranged such that, when the main spot Bm is on the center line of one of the grooves G, the sub-spots Bs1 and Bs2 are on the center lines of two adjacent lands L interposing the groove of the main spot Bm.

The conventional optical disk device of FIG. 2 includes a main photodetector having two equal photodiodes which receive a reflection beam from the main spot Bm on the disk 100, a sub-photodetector having two equal photodiodes which receive a reflection beam from the sub-spot Bs1 on the disk 100, and a sub-photodetector having two equal photodiodes which receive a reflection beam from the sub-spot Bs2 on the disk 100. The two photodiodes of each photodetector are aligned in the radial direction of the disk 100. As shown in FIG. 2, when the main spot Bm is on the center line of one of the grooves G, the sub-spots Bs1 and Bs2 are one the center lines of the two adjacent lands.

In the conventional optical disk device, a push-pull signal indicating a difference between signals output from the two photodiodes of each photodetector when they receive the reflection beam, and a sum signal indicating a sum of signals output from the two photodiodes of each photodetector when they receive the reflection beam.

Hereinafter, a push-pull signal means a signal indicating the difference between the output signals of the two photodiodes of each photodetector, and a sum signal means a signal indicating the sum of the output signals of the two photodiodes of each photodetector.

FIGS. 3A through 3E show a tracking error signal produced from various push-pull signals by the conventional optical disk device of FIG. 2. FIGS. 4A through 4E show a track crossing signal produced from various sum signals by the conventional optical disk device of FIG. 2. In FIGS. 3A through 3E and FIGS. 4A through 4E, vertical one-dot chain lines indicate the positions of the center lines of the grooves G (the tracks) of the optical disk 100 in FIG. 2.

As shown in FIG. 3A, a push-pull signal Md is produced in response to the reflection beam from the main spot Bm. The push-pull signal Md becomes zero when the main spot Bm is either on the center line of one of the grooves G or on the center line of one of the lands L. The amplitude of the push-pull signal Md varies in the form of a sine wave.

As shown in FIG. 4A, a sum signal Ms is produced in response to the reflection beam from the main spot Bm. The sum signal Ms is a sinusoidal signal having an offset component. The amplitude of the sum signal Ms becomes small when the main spot Bm is on one of the grooves G and becomes great when the main spot Bm is on one of the lands L.

As shown in FIGS. 3B and 3C, push-pull signals S1d and S2d are produced in response to the reflection beams from the sub-spots Bs1 and Bs2. The push-pull signals S1d and S2d are sinusoidal signals having a phase difference of 180 degrees to the phase of the push-pull signal Md.

As shown in FIGS. 4B and 4C, sum signals S1s and S2s are produced in response to the reflection beams from the sub-spots Bs1 and Bs2. Similarly, the sum signals S1s and S2s are sinusoidal signals having an offset component and a phase difference of 180 degrees to the phase of the sum signal Ms.

As shown in FIG. 3D, a sum signal (S1d+S2d) is produced by the sum of the push-pull signals S1d and S2d. As shown in FIG. 3E, a tracking error signal (Md −(S1d+S2d)) is produced by the difference between the push-pull signal Md and the sum signal (S1d+S2d). This tracking error signal will be referred to as the tracking error signal TE. Thus, the conventional optical disk device of FIG. 2 produces the tracking error signal TE.

When an optical axis deviation or an optical disk inclination has occurred, the push-pull signal Md and the sum signal (S1d+S2d), produced based upon the push-pull signals S1d and S2d, have offset components (which are indicated by dotted lines in FIGS. 3A through 3D) in the same direction due to the influence of the optical axis deviation or the optical disk inclination. Since the tracking error signal TE is produced by the difference between the push-pull signal Md and the sum signal (S1d+S2d), the offset components of both are canceled. Thus, the tracking error signal TE has no offset component, and the tracking error signal TE is used by the conventional optical disk device to correctly carry out the tracking servo control.

Similarly, as shown in FIG. 4D, a sum signal (S1s+S2s) is produced by the sum of the sum signals S1s and S2s. As shown in FIG. 4E, a track crossing signal (Ms −(S1s+S2s)) is produced by the difference between the sum signal Ms and the sum signal (S1s+S2s). This track crossing signal will be referred to as the track crossing signal TC. Thus, the conventional optical disk device of FIG. 2 produces the track crossing signal TC.

As shown in FIG. 4E, the track crossing signal TC is a sinusoidal signal which becomes negative when the main spot Bm is on one of the grooves G and becomes positive when the main spot Bm is on one of the lands L. Thus, by using the track crossing signal TC, it is possible to determine whether the main spot is on the center line of one of the tracks of the disk 100 or between two adjacent tracks of the disk 100.

The sum signals Ms, S1s, S2s and (S1s+S2s) and the track crossing signal TC are influenced depending upon whether the spot is on a recorded track of the disk 100 or on a non-recorded track of the disk 100. In FIGS. 4A through 4E, the amplitude of the above sum signals in the case of the recorded track is reduced from that of the above sum signals in the case of the non-recorded track. The former signals with the reduced amplitude are indicated by dotted lines in FIGS. 4A through 4E, and the latter signals with the greater amplitude are indicated by solid lines in FIGS. 4A through 4E.

Generally, the sum signal Ms and the sum signal (S1s+S2s) are influenced by the difference in the quantity of light between the reflection beam from the recorded track and the reflection beam from the non-recorded track in the same way. Since the track crossing signal TC is produced by the difference between the sum signal Ms and the sum signal (S1s+S2s), such an offset component is canceled by each other. Therefore, the track crossing signal TC is not influenced by the difference in the quantity of the reflection beam between the recorded track and the non-recorded track. Thus, the conventional optical disk device can produce a stable track crossing signal TC.

Recently, a new optical disk 101 in which tracks are formed with alternate lands and grooves on the surface of the new optical disk, the lands and the grooves having the same radial width, has been proposed. In order to increase the amount of information recorded therein, data is recorded onto or reproduced from both the lands and the grooves of the new optical disk.

FIG. 5 shows a positional relationship between spots of another conventional optical disk device and tracks of the new optical disk 101. In FIG. 5, the radial direction of the disk 101 is indicated by the arrow "X", and the tangential direction of the disk 101 is indicated by the arrow "Y".

As shown in FIG. 5, the lands L and the grooves G of the new optical disk 101 have the same radial width. In the conventional optical disk device of FIG. 5, a main spot Bm and sub-spots Bs1 and Bs2 are arranged such that, when the main spot Bm is on the center line of one of the grooves G, the sub-spots Bs1 and Bs2 are on the center lines of two adjacent lands L interposing the groove of the main spot Bm.

FIGS. 6A through 6E show a problem of the conventional optical disk device of FIG. 5 when producing a track crossing signal from various sum signals. In FIGS. 6A through 6E, vertical one-dot chain lines indicate the positions of the center lines of the lands L and the grooves G of the optical disk 101 in FIG. 5. Both the lands L and the grooves G form the tracks of the optical disk 101.

As shown in FIG. 6A, the sum signal Ms which is produced in response to the reflection beam from the main spot Bm in the above case is a sinusoidal signal having an offset component. The amplitude of the sum signal Ms becomes great when the main spot Bm is on one of the grooves G or on one of the lands L of the disk 101, and becomes small when the main spot Bm is between the adjacent land L and groove G of the disk 101.

In the case of FIG. 2, the sum signal Ms is in the form of a sinusoidal signal having a period for the radial widths of the adjacent land L and groove G of the disk 100. In the case of FIG. 5, however, the sum signal Ms is in the form of a sinusoidal signal having two periods for the radial widths of the adjacent land L and groove G of the disk 101.

As shown in FIGS. 6B and 6C, the sum signals S1s and S2s which are produced in response to the reflection beams from the sub-spots Bs1 and Bs2 in the case of FIG. 5 are sinusoidal signals having an offset component and a phase difference of 360 degrees to the phase of the sum signal Ms. In other words, the sum signal Ms and the sum signals S1s and S2s have no phase difference.

As shown in FIG. 6D, the sum signal (S1s+S2s) is produced by the sum of the sum signals S1s and S2s. The sum signal (S1s+S2s) is a sinusoidal signal having an offset component, and the amplitude of the sum signal (S1s+S2s) is increased to a level which is almost the same as the amplitude of the sum signal Ms. The track crossing signal (Ms−(S1s+S2s)) is produced by the difference between the sum signal Ms and the sum signal (S1s+S2s). As shown in FIG. 6E, this track crossing signal is always zero since the sum signal Ms and the sum signal (S1s+S2s) have the same amplitude and no phase difference. Therefore, it is difficult for the conventional optical disk device of FIG. 5 to produce a stable track crossing signal TC from the sum signals produced in response to the reflection beams from the spots on the disk 101. Thus, it is impossible for the conventional optical disk device to determine whether the main spot is on the center line of one of the tracks of the disk 101 or between two adjacent tracks of the disk 101.

When data is recorded onto or reproduced from both the lands and the grooves of the new optical disk, the new optical disk does not have a non-recorded area between adjacent land and groove. The tracking error signal produced in this case is likely to have an offset component due to the influence of data pits (or recording marks) of neighboring tracks adjacent to the track of the main spot. To prevent the tracking error signal from having the offset component being included in the tracking error signal, an improved tracking method for the new optical disk has been proposed. In the improved tracking method, sample pits are additionally provided on the new optical disk, and the tracking error signal is produced when the spot crosses the sample pits and the relevant track of the disk. The influence of the data pits of neighboring tracks can be eliminated by the use of the sample pits. Thus, the improved tracking method can suitably produce the tracking error signal with no offset component. For example, Japanese Laid-Open Patent Application No.6-203411 ("Koukai") discloses such a tracking method for the new optical disk.

In the conventional tracking method of the above-mentioned publication, it is necessary that a large number of sample pits be provided in the new optical disk, in order to suitably obtain the tracking error signal. This contradicts the demand for increasing the amount of information recorded on the optical disk.

SUMMARY OF THE INVENTION

An object of the present invention is to provide an improved optical disk tracking method and an improved optical disk device in which the above-described problems are eliminated.

Another object of the present invention is to provide an optical disk tracking method which allows a stable tracking error signal and a stable track crossing signal to be accurately produced when a tracking of an optical disk is performed.

Still another object of the present invention is to provide an optical disk device which can accurately produce a stable tracking error signal and a stable track crossing signal when a tracking of an optical disk is performed.

A further object of the present invention is to provide an optical disk tracking method which effectively prevents the tracking error signal from having an offset component due to the influence of an optical axis deviation or an optical disk inclination, and effectively prevents the track crossing signal from having an offset component due to the influence of a recorded track and a non-recorded track on the optical disk.

Another object of the present invention is to provide an optical disk device which effectively prevents the tracking error signal from having an offset component due to the influence of an optical axis deviation or an optical disk inclination, and effectively prevents the track crossing signal from having an offset component due to the influence of a recorded track and a non-recorded track on the optical disk.

The above-mentioned objects of the present invention are achieved by a tracking method of an optical disk, the disk having tracks formed with alternate lands and grooves on a surface of the disk, which comprises steps of: converting a beam of laser light emitted by a laser light source into a main beam and at least one sub-beam; placing a main spot on the disk by the main beam and at least one sub-spot on the disk by the sub-beam such that when the main spot is on a center line of one of the tracks the sub-spot is between the center line of the above one of the tracks and a center line of an adjacent track; producing a first push-pull signal from a reflection beam from the main spot on the disk; producing a second push-pull signal from a reflection beam from the sub-spot on the disk; producing a tracking error signal based upon the first push-pull signal; and producing a track crossing signal based upon the second push-pull signal.

The above-mentioned objects of the present invention are achieved by an optical disk device for tracking an optical disk, the disk having tracks formed with alternate lands and grooves on a surface of the optical disk, which comprises: a laser light source; an optical system which has a beam converting unit and an objective lens, the beam converting unit converting a beam of laser light emitted by the laser light source into a main beam and at least one sub-beam, and the objective lens placing a main spot on the disk by the main beam and at least one sub-spot on the disk by the sub-beam such that when the main spot is on a center line of one of the tracks the sub-spot is between the center line of the one of the tracks and a center line of an adjacent track; a first unit, coupled to two equal first photodiodes, which produces a first push-pull signal from a reflection beam from the main spot on the disk; a second unit, coupled to two equal second photodiodes, which produces a second push-pull signal from a reflection beam from the sub-spot on the disk; a tracking error signal generating unit which produces a tracking error signal based upon the first push-pull signal; and a track crossing signal generating unit which produces a track crossing signal based upon the second push-pull signal.

It is possible for the optical disk tracking method and the optical disk device of the present invention to produce a stable tracking error signal and a stable track crossing signal with a high level of accuracy in order to carry out the tracking servo control of the optical disk. Further, it is possible for the present invention to effectively prevent the tracking error signal from having an offset component due to the influence of an optical axis deviation or an optical disk inclination. Further, it is possible for the present invention to effectively prevent the tracking error signal from having an offset component due to the influence of a recorded track and a non-recorded track on the optical disk.

BRIEF DESCRIPTION OF THE DRAWINGS

Other objects, features and advantages of he present invention will become more apparent from the following detailed description when read in conjunction with the accompanying drawings in which:

FIGS. 4A through 4E are timing charts for explaining a track crossing signal produced from sum signals by the conventional optical disk device of FIG. 2;

FIG. 5 is a diagram for explaining a positional relationship between spots of another conventional optical disk device and tracks of another optical disk;

FIGS. 6A through 6E are timing charts for explaining a problem of the conventional optical disk device of FIG. 5 when producing a track crossing signal from sum signals;

FIGS. 11A through 11E are timing charts for explaining signals produced by the optical disk device of FIG. 10;

FIGS. 14A through 14D are timing charts for explaining signals produced by the optical disk device of FIG. 13;

FIGS. 19A through 19D are diagrams for explaining a further embodiment of the optical disk device of the present invention;

DETAILED DESCRIPTION OF THE PREFERRED EMBODIMENTS

A description will now be given of the preferred embodiments of the present invention with reference to the accompanying drawings.

Figure 1A:
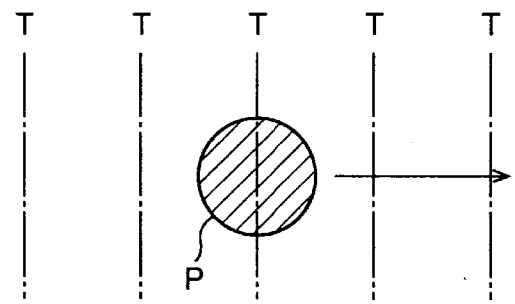
FIGS. 1A and 1B are diagrams for explaining a tracking error signal produced by a conventional optical disk device when a spot crosses tracks of an optical disk one by one.
Figure 1B:
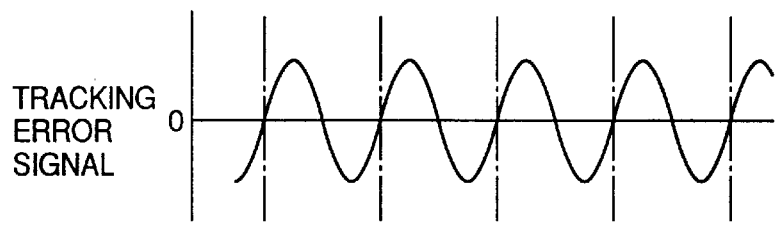
Figure 2:
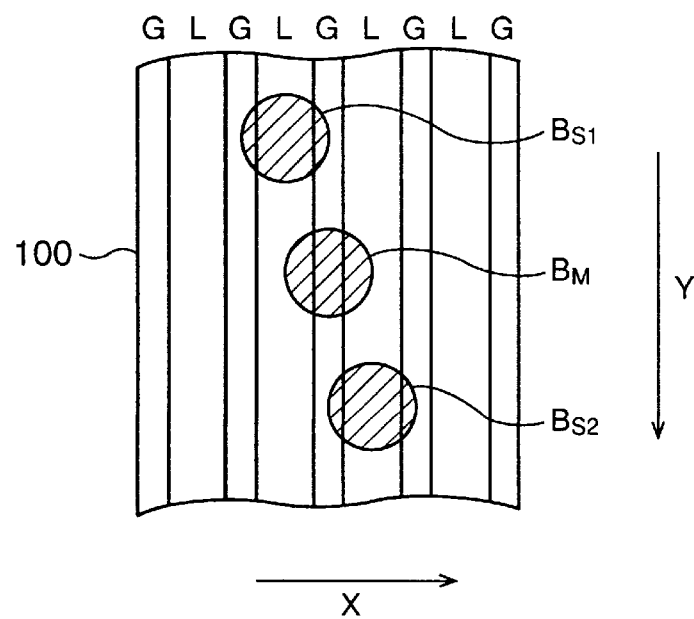
FIG. 2 is a diagram for explaining a positional relationship between spots of a conventional optical disk device and tracks of an optical disk used by a conventional differential push-pull method.
Figures 3A, 3B, 3C, 3D, 3E:
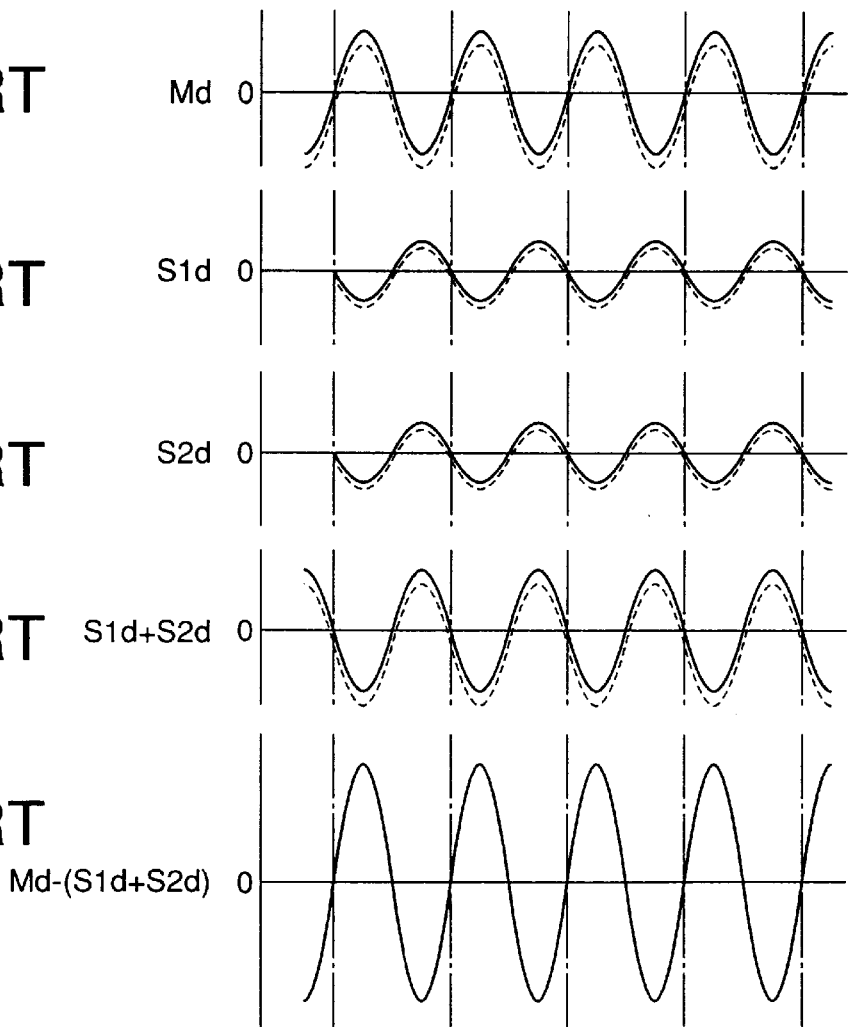
FIGS. 3A through 3E are timing charts for explaining a tracking error signal produced from push-pull signals by the conventional optical disk device of FIG. 2.
Figure 7A:
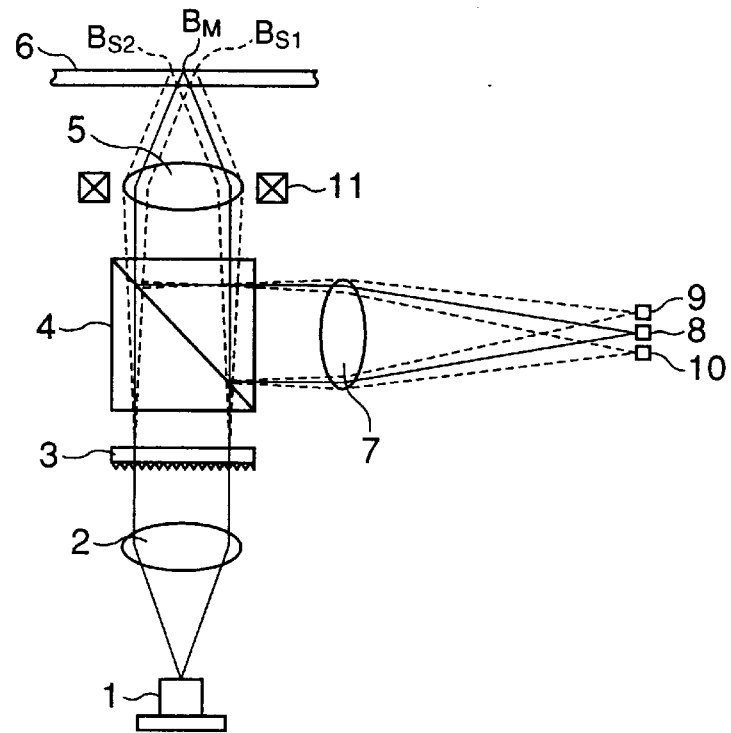
FIGS. 7A and 7B are diagrams showing an optical disk device to which one embodiment of the present invention is applied.
Figure 7B:
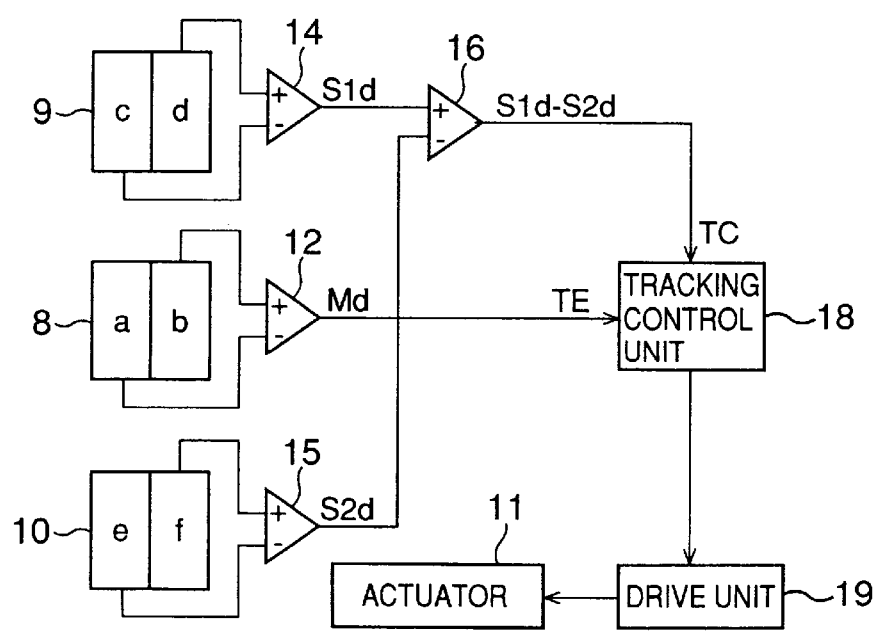

FIG. 7A shows an optical system of an optical disk device to which one embodiment of the present invention is applied. FIG. 7B shows a tracking control unit of the optical disk device which operates with the optical system in FIG. 7A.

As shown in FIG. 7A, a beam of laser light emitted by a laser diode (or a semiconductor laser) 1 enters a collimator lens 2, and a parallel beam leaves the collimator lens 2. The laser diode 1 is a laser light source of the optical disk device. The parallel beam from the collimator lens 2 enters a diffraction grating 3, and the diffraction grating 3 converts the parallel beam into a number of diffracted light beams. In the diffraction grating 3, the transmittance of diffracted light beams varies in the form of a sine wave. The diffraction grating 3 is a beam converting unit of the optical disk device.

The diffracted light beams leaving the diffraction grating 3 include a 0-order diffracted light beam and ±1-order diffracted light beams. These beams pass through a beam splitter 4 along an optical axis of the optical system. The diffracted light beams from the beam splitter 4 enter an objective lens 5, and converging diffracted light beams leave the objective lens 5. The converging 0-order diffracted light beam from the objective lens 5 produces a main spot "Bm" hitting a surface of an optical disk 6, and the converging ±1-order diffracted light beams from the objective lens 5 produce a pair of sub-spots "Bs1" and "Bs2" hitting the surface of the optical disk 6. The main spot Bm and the sub-spots Bs1 and Bs2 are small spots on the surface of the optical disk 6. Therefore, the optical system of FIG. 7A produces the main spot Bm and the sub-spots Bs1 and Bs2 on the optical disk 6 by the beam of laser light emitted by the laser diode 1.

Reflection beams from the spots Bm, Bs1 and Bs2 on the optical disk 6 enter the objective lens 5, and parallel beams leave the objective lens 5. The parallel beams from the objective lens 5 enter the beam splitter 4 again, and reflection beams, split from the incident parallel beams, are reflected off the beam splitter 4 in a direction perpendicular to the direction of the incident parallel beams. The reflection beams from the beam splitter 4 enter a light-collecting lens 7 in the perpendicular direction, and converging light beams from the light-collecting lens 7 hit a main photodetector 8 and a pair of sub-photodetectors 9 and 10. The reflection beams from the main spot Bm and the sub-spots Bs1 and Bs2 on the optical disk 6 thus enter the photodetectors 8, 9 and 10.

The photodetectors 8, 9 and 10 output signals based upon the reflection beams from the main spot Bm and the sub-spots Bs1 and Bs2, and the output signals of the photodetectors 8, 9 and 10 are used by the optical disk device to produce a tracking error signal and a track crossing signal.

As shown in FIG. 7A, the optical disk device includes an actuator 11 provided adjacent to the objective lens 5. The actuator 11 moves the objective lens 5 relative to the optical disk 6 in a tracking direction of the optical disk 6.

Figure 8:
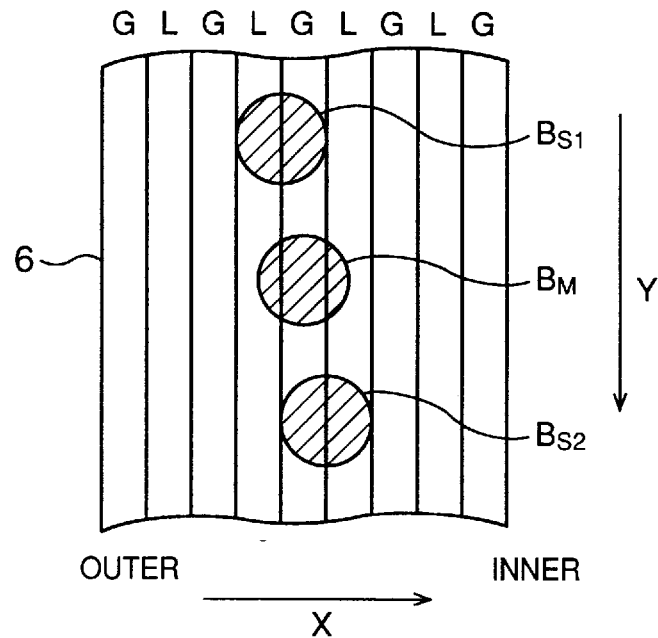
FIG. 8 is a diagram for explaining a positional relationship between spots of the optical disk device and tracks of an optical disk.

FIG. 8 shows a positional relationship between the spots Bm, Bs1 and Bs2 of the optical disk device of FIGS. 7A and 7B and the tracks of the optical disk 6. In FIG. 8, a radial direction of the optical disk 6 is indicated by the arrow "X", and a tangential direction of the optical disk 6 is indicated by the arrow "Y".

As shown in FIG. 8, the tracks of the optical disk 6 are formed with alternate lands L and grooves G on a surface of the disk 6, the lands L and the grooves G having a substantially equal radial width in the radial direction X of the disk 6. That is, the ratio of the radial distance of each land L to the radial distance of each groove G is substantially equal to 1:1.

The optical disk 6 is a new type optical disk having a high recording density in which data is recorded onto or reproduced from both the lands L and the grooves G, the lands L and the grooves G forming the tracks of the optical disk 6. The optical disk 6 has the tracks formed with the alternate lands and grooves, and the lands and the grooves have the same radial width. Hereinafter, a radial distance between two adjacent tracks of the optical disk will be referred to the radial distance between the center line of one of the lands and the center line of an adjacent groove of the disk 6.

Generally, the reflection beam from the main spot Bm is used for recording, playing or erasing information on the optical disk 6. Further, the reflection beam from the main spot Bm is used by the optical disk device to carry out the focusing and tracking control, and the reflection beams from the sub-spots Bs1 and Bs2 are used by the optical disk device for the tracking control.

As shown in FIG. 8, in the optical disk device of the present embodiment, when the main spot Bm is on the center line of one of the grooves G, the sub-spot Bs1 is between the center line of the groove G and the center line of an outer adjacent land L (adjacent to the left side of the groove G of the main spot Bm), and the sub-spot Bs2 is between the center line of the groove G and the center line of an inner adjacent land L (adjacent to the right side of the groove G of the main spot Bm). By adjusting the position of the objective lens 5 relative to the optical disk 6, the main spot Bm and the sub-spots Bs1 and Bs2 are arranged on the optical disk 6 as mentioned above.

The positions of the sub-spots Bs1 and Bs2 on the surface of the optical disk 6 are symmetrical with respect to the position of the main spot BEm, and the positions of the sub-spots Bs1 and Bs2 are separate from each other in the tangential direction Y (the disk rotating direction) of the optical disk 6. When the sub-spot Bs1 is located at a preceding position on the optical disk 6 in the tangential direction, the sub-spot Bs2 is located at a following position on the optical disk 6 in the tangential direction Y.

As shown in FIG. 7B, the main photodetector 8 includes two equal photodiodes "a" and "b" which are aligned in the radial direction X (the track crossing direction) of the optical disk 6. The sub-photodetector 9 includes two equal photodiodes "c" and "d" which are aligned in the radial direction X of the optical disk 6. The sub-photodetector 10 includes two equal photodiodes "e" and "If" which are aligned in the radial direction X of the optical disk 6.

A differential amplifier 12 is coupled to the main photodetector 8. The differential amplifier 12 outputs a push-pull signal Md which indicates a difference between a signal output by the photodiode "a" and a signal output by the photodiode "b". The push-pull signal Md output by the differential amplifier 12 is used as a tracking error signal TE of the optical disk device of the present embodiment. Therefore, the differential amplifier 12 constitutes a tracking error signal generating unit of the optical disk device of the present embodiment.

A differential amplifier 14 is coupled to the sub-photodetector 9 and a differential amplifier 15 is coupled to the sub-photodetector 10. The differential amplifier 14 outputs a push-pull signal S1d which indicates a difference between a signal output by the photodiode "c" and a signal output by the photodiode "d". The differential amplifier 15 outputs a push-pull signal S2d which indicates a difference between a signal output by the photodiode "e" and a signal output by the photodiode "f".

Further, a differential amplifier 16 is coupled to the differential amplifiers 14 and 15. The differential amplifier 16 outputs a signal (S1d−S2d) which indicates a difference between the push-pull signal S1d output by the amplifier 14 and the push-pull signal S2d output by the amplifier 15. The signal (S1d−S2d) output by the differential amplifier 16 is used as a track crossing signal TC of the optical disk device of the present embodiment. Therefore, the amplifiers 14, 15 and 16 constitute a track crossing signal generating unit of the optical disk device of the present embodiment.

Further, as shown in FIG. 7B, a tracking control unit 18 is coupled to the differential amplifiers 12 and 16. The tracking control unit 18 inputs the tracking error signal TE from the amplifier 12 and the track crossing signal TC from the amplifier 16. The tracking control unit 18 outputs a driving signal in response to the tracking error signal TE and the track crossing signal TC.

A drive unit 19 is coupled to the tracking control unit 18. The drive unit 19 controls the actuator 11 in accordance with the driving signal output by the tracking control unit 18. That is, the drive unit 19 supplies electric power to the actuator 11 in accordance with the diving signal, so that the actuator 11 moves the objective lens 5 in the tracking direction by using the supplied power. The tracking servo control is thus carried out by the optical disk device of the present embodiment.

FIGS. 9A through 9D show the signals produced by the optical disk device of FIGS. 7A and 7B. In FIGS. 9A through 9D, vertical one-dot chain lines indicate the positions of the center lines of the grooves G and the lands L of the optical disk 6. Both the grooves G and the lands L form the tracks of the optical disk 6.

In the optical disk device in FIGS. 7A and 7B, the reflection beam from the main spot Bm on the optical disk 6 is received by the main photodetector 8, and the reflection beams from the sub-spots Bs1 and Bs2 are received by the sub-photodetectors 9 and 10.

Figure 9A:
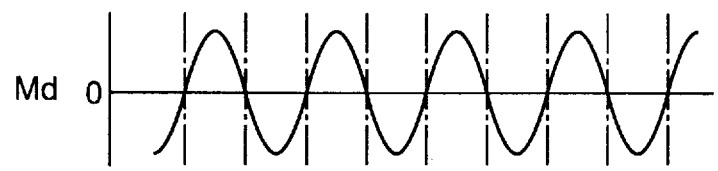
FIGS. 9A through 9D are timing charts for explaining signals produced by the optical disk device of FIGS. 7A and 7B.

The photodiodes "a" and "b" of the main photodetector 8 output the signals in response to the reflection beam from the main spot Bm. As described above, the differential amplifier 12 outputs the push-pull signal Md indicating the difference between the signals output by the photodiodes "a" and "b" of the main photodetector 8. The amplitude of the push-pull signal Md at the output of the amplifier 12 varies in the form of a sine wave, as shown in FIG. 9A. The push-pull signal Md becomes zero when the main spot Bm crosses the center lines of the grooves G and the lands L of the optical disk 6 one by one. Therefore, the push-pull signal Md is used as the tracking error signal TE of the optical disk device of the present embodiment.

The photodiodes "c" and "d" of the sub-photodetector 9 output the signals in response to the reflection beam from the sub-spot Bs1, and the photodiodes "e" and "f" of the sub-photodetector 10 output the signals in response to the reflection beam from the sub-spot Bs2.

Figure 9B:
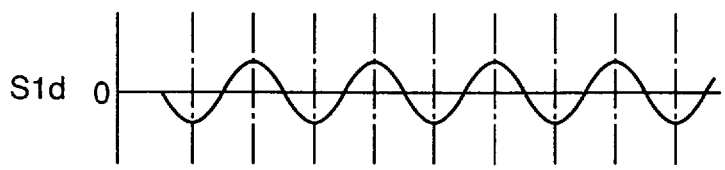
Figure 9C:
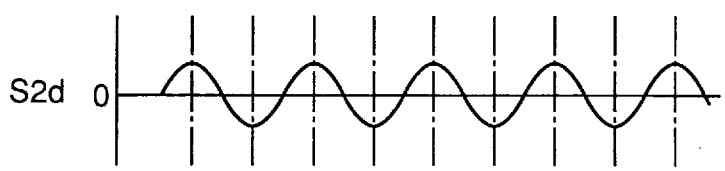

As described above, the differential amplifier 14 outputs the push-pull signal S1d indicating the difference between the signals output by the photodiodes "c" and "d", and the differential amplifier 15 outputs the push-pull signal S2d indicating the difference between the signals output by the photodiodes "e" and "f". As shown in FIG. 9B, the amplitude of the push-pull signal S1d varies in the form of a sine wave, the push-pull signal S1d having a phase difference of −90 degrees to the phase of the push-pull signal Md. As shown in FIG. 9C, the amplitude of the push-pull signal S2d varies in the form of a sine wave, the push-pull signal S2d having a phase difference of +90 degrees to the phase of the push-pull signal Md.

Figure 9D:
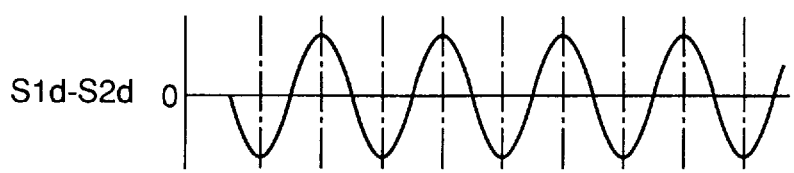

Further, as described above, the differential amplifier 16 outputs the signal (S1d−S2d) indicating the difference between the push-pull signals S1d and S2d from the amplifiers 14 and 15. As shown in FIG. 9D, the amplitude of the signal (S1d−S2d) at the output of the amplifier 16 varies in the form of a sine wave, the signal (S1d−S2d) having the same phase difference as the push-pull signal S1d. The amplitude of the signal (S1d−S2d) is increased to nearly twice as great as the amplitude of each of the push-pull signals S1d and S2d.

The signal (S1d−S2d) as well as the push-pull signals S1d and S2d becomes zero when the sub-spots Bs1 and Bs2 are on the boundaries of adjacent grooves and lands on the optical disk 6. More specifically, when the sub-spot Bs1 is between the center line of the groove G of the main spot Bm and the center line of the outer adjacent land L and the sub-spot Bs2 is between the center line of the groove G of the main spot Bm and the center line of the inner adjacent land L, the signal (S1d−S2d) as well as the push-pull signals S1d and S2d becomes zero. Further, even if the sub-spots Bs1 and Bs2 cross a boundary area between a recorded track and a non-recorded track on the optical disk 6, the signal (S1d+S2d) becomes zero when the sub-spots Bs1 and Bs2 are on the boundaries of the adjacent grooves and lands on the optical disk 6, and this is not influenced depending upon whether the sub-spots Bs1 and Bs2 are on the recorded track or on the non-recorded track. Therefore, the signal (S1d−S2d) is used as the track crossing signal TC of the optical disk device of the present embodiment.

It is possible for the optical disk tracking method and the optical disk device of the present embodiment to produce a stable tracking error signal and a stable track crossing signal with a high level of accuracy in order to carry out the tracking servo control of the optical disk.

Alternatively, one of the push-pull signal S1d and the push-pull signal S2d may be directly used as the track crossing signal TC of the above-described embodiment instead of the signal (S1d−S2d). When the push-pull signal S1d is used instead, the polarity of the push-pull signal S1d is the same as that of the signal (S1d−S2d), and a detection as to the polarity of the push-pull signal S1d is not needed. When the push-pull signal S2d is used instead, the polarity of the push-pull signal S2d is reversal to that of the signal (S1d−S2d), and it is needed to perform a detection as to the polarity of the push-pull signal S2d.

In the above-described embodiment, the main spot Bm on the optical disk 6 is produced by the 0-order diffracted light beam from the diffraction grating 3, and the sub-spots Bs1 and Bs2 on the optical disk 6 are produced by the ±1-order diffracted light beams from the diffraction grating 3. Since the quantity of the reflection beams from the sub-spots Bs1 and Bs2 is rather smaller than the quantity of the reflection beam from the main spot Bm, it is desirable that the signal (S1d−S2d) having the increased amplitude is used as the track crossing signal TC, in order to make the track crossing signal TC stable. When one of the push-pull signals S1d and S2d is used, the track crossing signal TC will have a relative small amplitude.

Figure 10:
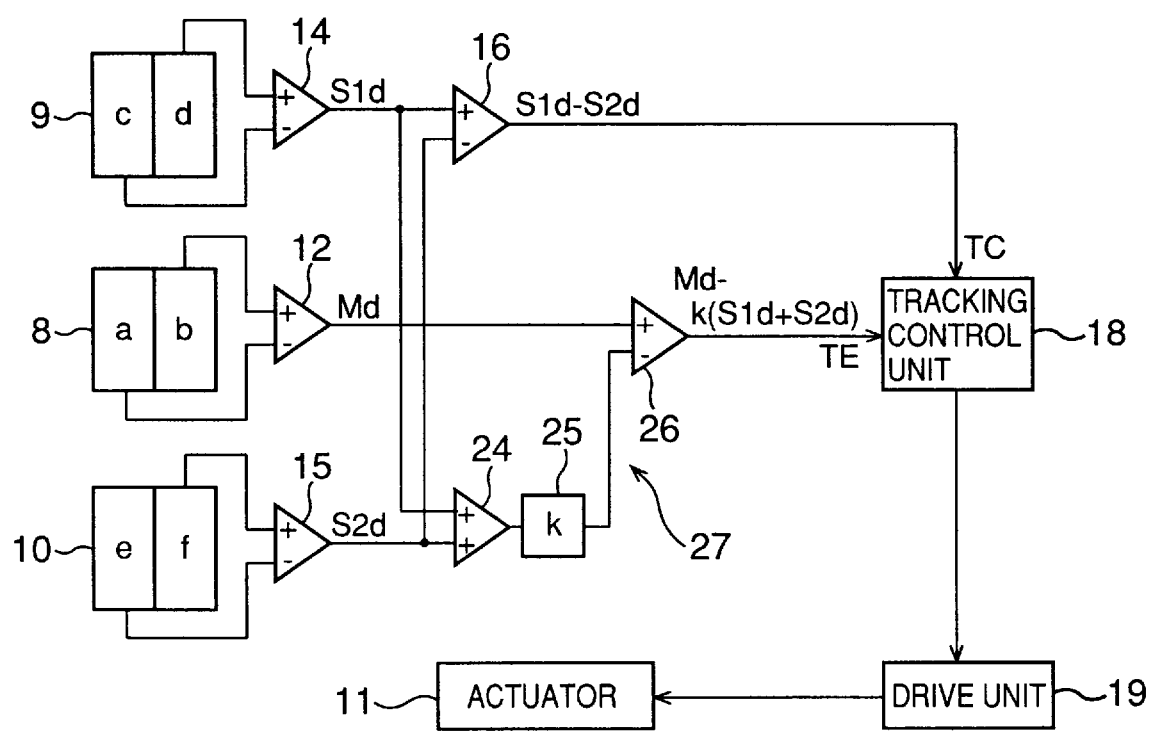
FIG. 10 is a block diagram showing another embodiment of the optical disk device of the present invention.

FIG. 10 shows another embodiment of the optical disk device of the present invention. FIGS. 11A through 11E show signals produced by the optical disk device of FIG. 10. In FIGS. 10 through 11E, the elements which are the same as corresponding elements in FIGS. 7B and 9A through 9D are designated by the same reference numerals, and a description thereof will be omitted.

The optical disk device of FIG. 10 includes an optical system which is the same as the optical system of FIG. 7A.

In the optical disk device of FIG. 10, the differential amplifier 12 outputs the push-pull signal Md which indicates the difference between the signal output by the photodiode "a" and the signal output by the photodiode "b". The differential amplifier 14 outputs the push-pull signal S1d which indicates the difference between the signal output by the photodiode "c" and the signal output by the photodiode "d". The differential amplifier 15 outputs the push-pull signal S2d which indicates the difference between the signal output by the photodiode "e" and the signal output by the photodiode "f".

In the optical disk device of FIG. 10, a summing amplifier 24 is coupled to the amplifier 14 and the amplifier 15. The summing amplifier 24 outputs a sum signal (S1d+S2d) which indicates a sum of the push-pull signal S1d from the amplifier 14 and the push-pull signal S2d from the amplifier 15. A coefficient amplifier 25 is coupled to the summing amplifier 24. The coefficient amplifier 25 outputs a signal k(S1d+S2d) which indicates a multiplication of the sum signal (S1d+S2d) from the amplifier 24 by a coefficient "k". The coefficient k indicates a ratio of the quantity of the main-spot reflection beam to the quantity of the sub-spot reflection beam. The coefficient k is a predetermined value appropriate for the optical disk device of the present embodiment.

Further, a differential amplifier 26 is coupled to the amplifier 12 and the amplifier 25. The differential amplifier 26 outputs a signal (Md−k(S1d+S2d)) which indicates a difference between the push-pull signal Md from the amplifier 12 and the signal k(S1d+S2d) from the amplifier 25. The use of the coefficient k allows the amplitude of the signal k(S1d+S2d) to be nearly equal to the amplitude of the push-pull signal Md, and it makes the difference signal (Md−k(S1d+S2d)) effective. The signal (Md−k(S1d+S2d)) output by the differential amplifier 26 is used as the tracking error signal TE of the optical disk device of the present embodiment.

As shown in FIGS. 11A through 11E, when an optical axis deviation or an optical disk inclination has occurred, the push-pull signal Md and the sum signal (S1d +S2d) have offset components (which are indicated by dotted lines in FIGS. 11A through 11D) in the same direction due to the influence of the optical axis deviation or the optical disk inclination. The phase of the push-pull signal S1d and the phase of the push-pull signal S2d are different from each other by 180 degrees, and the sum signal (S1d+S2d) includes only the offset component as shown in FIG. 11D. When the sum signal (S1d+S2d) is produced, the sinusoidal signal components of both S1d and S2d are canceled by each other.

Since the tracking error signal TE is produced by the difference between the push-pull signal Md and the signal k(S1d+S2d), the offset components of both are canceled as shown in FIG. 11E. Thus, the tracking error signal TE has no offset component, and the tracking error signal TE is used by the tracking control unit 18 of the optical disk device of the present embodiment to correctly carry out the tracking servo control.

In the above-described embodiment, the tracking error signal generating unit includes a first offset eliminating unit 27 which eliminates the above-mentioned offset component from the tracking error signal TE. The summing amplifier 24, the coefficient amplifier 25, and the differential amplifier 26 constitute the first offset eliminating unit 27 of the present embodiment.

The track crossing signal generating unit of the above-described embodiment is the same as that of the optical disk device of FIG. 7B; that is, it is constituted by the differential amplitudes 14, 15 and 16 in FIG. 10. The signal (S1d−S2d) at the output of the differential amplifier 16 is used as the track crossing signal TC of the optical disk device of the present embodiment.

It is possible for the optical disk tracking method and the optical disk device of the present embodiment to produce a stable tracking error signal and a stable track crossing signal with a high level of accuracy in order to carry out the tracking servo control of the optical disk. Further, it is possible for the present embodiment to effectively prevent the tracking error signal from having an offset component due to the influence of an optical axis deviation or an optical disk inclination.

Figure 12:
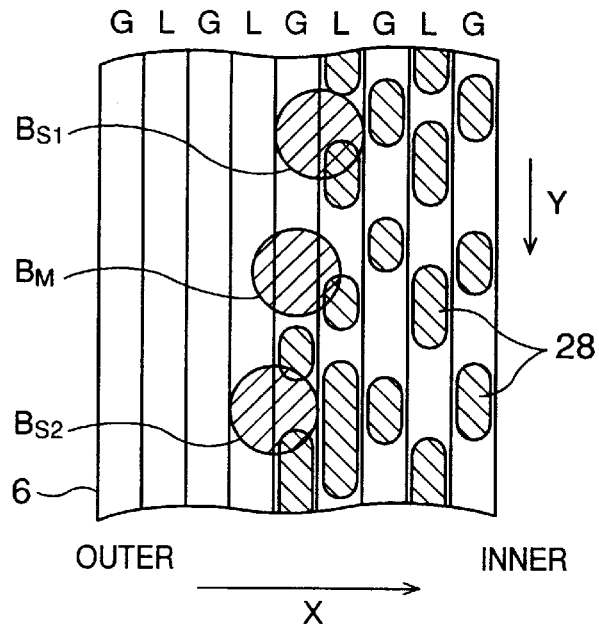
FIG. 12 is a diagram for explaining a positional relationship between spots of an optical disk device and tracks of the optical disk.

FIG. 12 shows a positional relationship between spots of an optical disk device of still another embodiment of the present invention and tracks of the optical disk 6.

In the optical disk device of the embodiment of FIG. 12, data is recorded onto the lands L and the grooves G of the optical disk 6 in an alternate manner when the optical disk 6 is rotated. An address at which the disk 6 is accessed by the optical disk device is increased as the spots Bm and Bs1 and Bs2 are moved from an inner track to an outer track, and the recording of the data onto the disk 6 is performed from a lower address to a higher address.

In the optical disk device of the present embodiment, the main spot Bm and the sub-spots Bs1 and Bs2 are placed on the optical disk 6, as shown in FIG. 12, such that the sub-spot Bs1 is a preceding sub-spot and the sub-spot Bs2 is a following sub-spot with respect to the disk rotating direction Y, and, when the main spot Bm is on the center line of one of the tracks (G or L), the preceding sub-spot Bs1 is between the center line of the track of the main spot Bm and the center line of an adjacent inner track (L or G) and the following sub-spot Bs2 is between the center line of the track of the main spot Bm and the center line of an adjacent outer track (L or G).

In FIG. 12, reference numeral 28 indicates a plurality of data pits on the tracks of the optical disk 6. As shown in FIG. 12, the main spot Bm (and/or the sub-spots Bs1 and Bs2) of the optical disk device is on the boundary between a recorded track and a non-recorded track on the optical disk 6. When data is recorded onto the non-recorded track by the main spot Bm, the data pits 28 are on the inner recorded track (which is inner than the track of the main spot Bm) and no data pits 28 are on the outer non-recorded track (which is outer than the track of the main spot Bm).

Conversely to that shown in FIG. 12, it is also conceivable that, when data is recorded onto the non-recorded track by the main spot Bm in the opposite direction, the data pits 28 are on the outer recorded track (which is outer than the track of the main spot Bm) and no data pits 28 are on the inner non-recorded track (which is inner than the track of the main spot Bm). It should be noted that the present embodiment is also applicable to the opposite-direction recording case.

Figure 13:
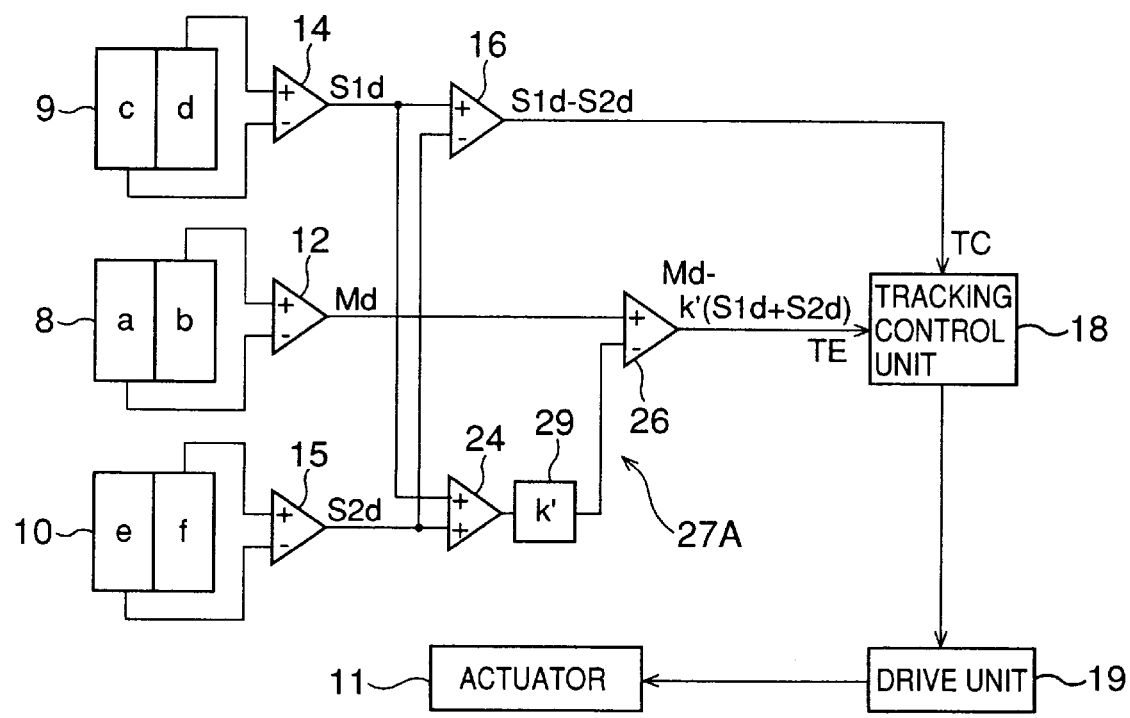
FIG. 13 is a block diagram showing still another embodiment of the optical disk device of the present invention.

FIG. 13 shows the optical disk device of the embodiment of FIG. 12. FIGS. 14A through 14E show signals produced by the optical disk device of FIG. 13. In FIGS. 13 through 14E, the elements which are the same as corresponding elements in FIGS. 7B and 9A through 9D are designated by the same reference numerals, and a description thereof will be omitted.

The optical disk device of FIG. 13 includes an optical system which is the same as the optical system of FIG. 7A. Similarly to the previous embodiment of FIG. 7B, the optical disk device of FIG. 13 includes the differential amplifier 12, the differential amplifier 14, and the differential amplifier 15.

In the optical disk device of FIG. 13, the summing amplifier 24 is coupled to the amplifier 14 and the amplifier 15. The summing amplifier 24 outputs the sum signal (S1d+S2d) which indicates the sum of the push-pull signal S1d from the amplifier 14 and the push-pull signal S2d from the amplifier 15. A coefficient amplifier 29 is coupled to the summing amplifier 24. The coefficient amplifier 29 outputs a signal k'(S1d+S2d) which indicates a multiplication of the sum signal (S1d+S2d) from the amplifier 24 by a coefficient "k". The coefficient k' is a predetermined value which is appropriate for the optical disk device of the present embodiment. The value of the coefficient k' is determined in accordance with the ratio of the quantity of the main-spot reflection beam to the quantity of the sub-spot reflection beam, and the degree of the influence of the recorded track and the non-recorded track on the optical disk.

Further, the differential amplifier 26 is coupled to the amplifier 12 and the amplifier 29. The differential amplifier 26 outputs a signal (Md−k'(S1d+S2d)) which indicates a difference between the push-pull signal Md from the amplifier 12 and the signal k'(S1d+S2d) from the amplifier 29. The use of the coefficient k' allows the amplitude of the signal k'(S1d+S2d) to be nearly equal to the amplitude of the push-pull signal Nd, and it makes the difference signal (Md−k'(S1d+S2d)) effective. The signal (Md−k'(S1d+S2d)) output by the differential amplifier 26 is used as the tracking error signal TE of the optical disk device of the present embodiment.

When the main spot Bm is on the non-recorded track of the optical disk 6, as shown in FIG. 12, the data pits 28 are already on the inner recorded track and no data pits 28 are on the outer non-recorded track. As shown in FIG. 14A–14C, the push-pull signals Md, S1d and S2d have offset components (which are indicated by dotted lines in FIGS. 14A through 14C) in the same direction due to the influence of the inner recorded track (with the data pits 28 thereon) and the outer non-recorded track (with no data pits 28 thereon).

The phase of the push-pull signal S1d and the phase of the push-pull signal S2d are different from each other by 180 degrees, and the sum signal (S1d+S2d) includes only the offset component indicated by a dotted line in FIG. 14D. When the sum signal (S1d+S2d) is produced, the sinusoidal signal components of both S1d and S2d are canceled by each other.

Since the tracking error signal TE is produced by the difference between the push-pull signal Md and the signal k'(S1d+S2d), the offset components of both are canceled as shown in FIG. 14E. Thus, the tracking error signal TE has no offset component, and the tracking error signal TE is used by the tracking control unit 18 of the optical disk device of the present embodiment to correctly carry out the tracking servo control.

In the above-described embodiment, the tracking error signal generating unit includes another first offset eliminating unit 27A which eliminates the above-mentioned offset component from the tracking error signal TE. The summing amplifier 24, the coefficient amplifier 29, and the differential amplifier 26 constitute the first offset eliminating unit 27A of the present embodiment.

The track crossing signal generating unit of the above-described embodiment is the same as that of the optical disk device of FIG. 7B; that is, it is constituted by the differential amplitudes 14, 15 and 16 in FIG. 13. The signal (S1d−S2d) at the output of the differential amplifier 16 is used as the track crossing signal TC of the optical disk device of the present embodiment.

It is possible for the optical disk tracking method and the optical disk device of the present embodiment to produce a stable tracking error signal and a stable track crossing signal with a high level of accuracy in order to carry out the tracking servo control of the optical disk. Further, it is possible for the present embodiment to effectively prevent the tracking error signal from having an offset component due to the influence of a recorded track and a non-recorded track on the optical disk.

Further, even when the optical disk device of any of the above-described embodiments is applied to an optical disk in which tracks are formed with alternate lands and grooves but the lands and the grooves having different widths in the radial direction of the disk, it is possible to produce a stable tracking error signal and a stable track crossing signal. It is also possible to effectively prevent the tracking error signal from having an offset component due to the influence of the optical axis deviation or the optical disk inclination or due to the influence of the recorded track and the non-recorded track on the optical disk.

Figure 15:
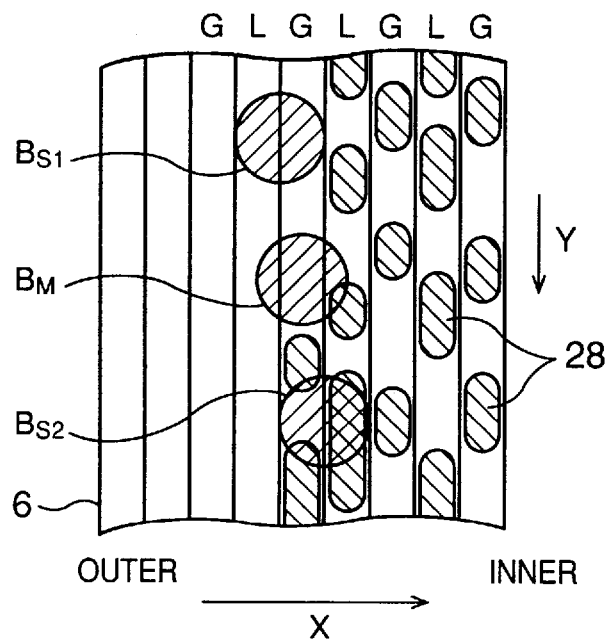
FIG. 15 is a diagram for explaining a positional relationship between spots of an optical disk device and tracks of the optical disk.

FIG. 15 shows a positional relationship between spots of an optical disk device of a further embodiment of the present invention and tracks of the optical disk 6.

Similarly to the previous embodiment of FIG. 12, in the optical disk device of the embodiment of FIG. 15, data is recorded onto the lands L and the grooves G of the optical disk 6 in an alternate manner when the optical disk 6 is rotated. An address at which the disk 6 is accessed by the optical disk device is increased as the spots Bm and Bs1 and Bs2 are moved from an inner track to an outer track, and the recording of the data onto the disk 6 is performed from a lower address to a higher address.

In the optical disk device of the present embodiment, the main spot Bm and the sub-spots Bs1 and Bs2 are placed on the optical disk 6, as shown in FIG. 15, such that the sub-spot Bs1 is a preceding sub-spot and the sub-spot Bs2 is a following sub-spot with respect to the disk rotating direction Y, and, when the main spot Bm is on the center line of one of the tracks (G or L), the preceding sub-spot Bs1 is between the center line of the track of the main spot Bm and the center line of an adjacent outer track (L or G) and the following sub-spot Bs2 is between the center line of the track of the main spot Bm and the center line of an adjacent inner track (L or G).

As shown in FIG. 15, the main spot Bm (and/or the sub-spots Bs1 and Bs2) of the optical disk device is on the boundary between a recorded track and a non-recorded track on the optical disk 6. When data is recorded onto the non-recorded track by the main spot Bm, the data pits 28 are on the inner recorded track (which is inner than the track of the main spot Bm) and no data pits 28 are on the outer non-recorded track (which is outer than the track of the main spot Bm).

Figure 16:
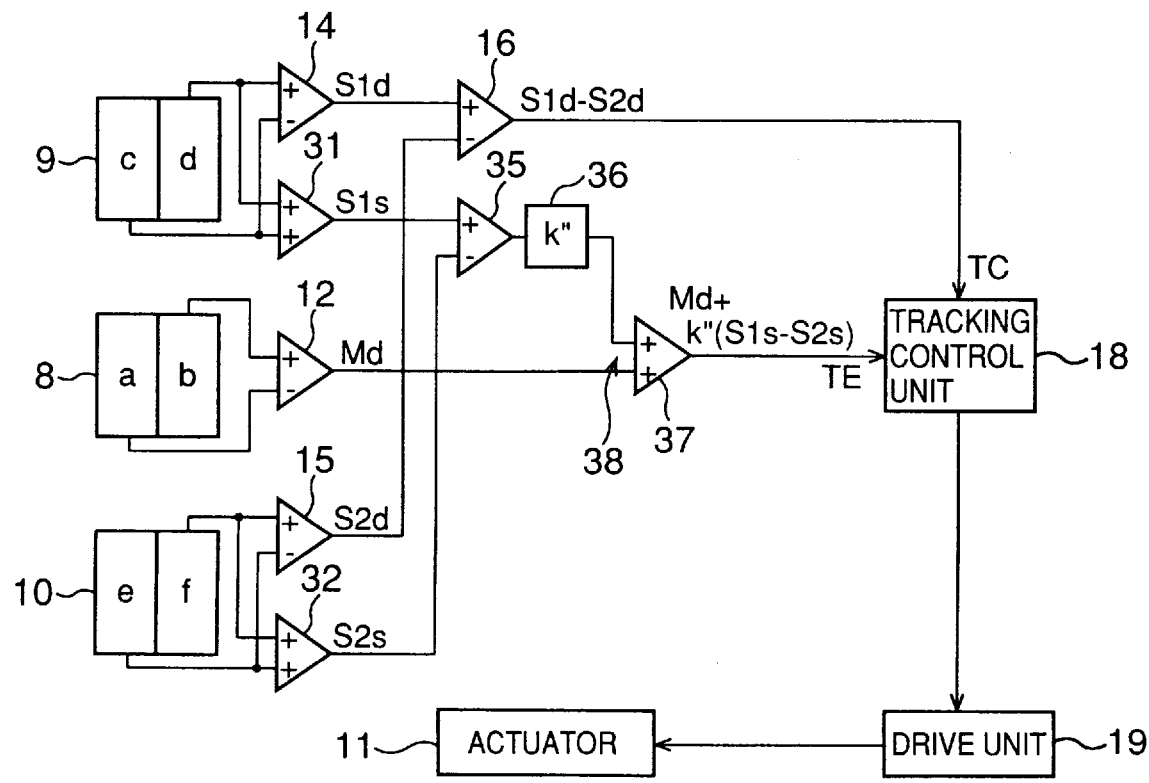
FIG. 16 is a block diagram showing a further embodiment of the optical disk device of the present invention.
Figure 17A:
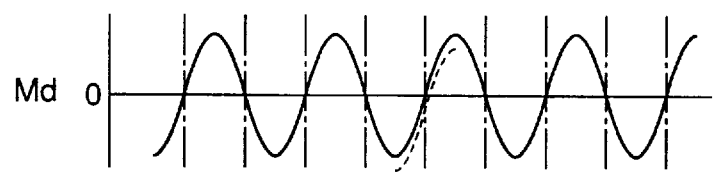
FIGS. 17A through 17E are timing charts for explaining signals produced by the optical disk device of FIG. 16.
Figure 17B:
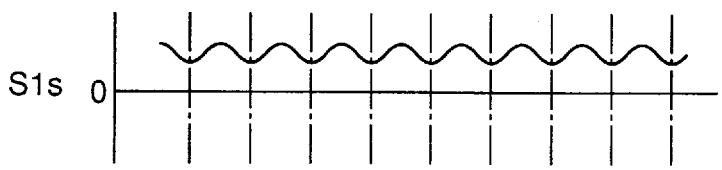
Figure 17C:
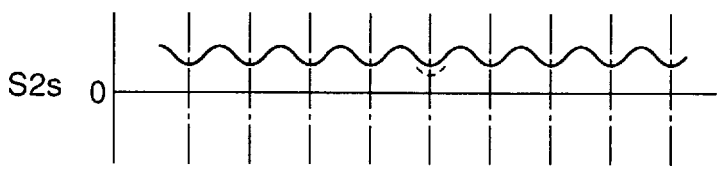

FIG. 16 shows the optical disk device of the embodiment of FIG. 15. FIGS. 17A through 17E show signals produced by the optical disk device of FIG. 16. In FIGS. 16 through 17E, the elements which are the same as corresponding elements in FIGS. 7B and 9A through 9D are designated by the same reference numerals, and a description thereof will be omitted.

The optical disk device of FIG. 16 includes an optical system which is the same as the optical system of FIG. 7A. Similarly to the previous embodiment of FIG. 7B, the optical disk device of FIG. 16 includes the differential amplifier 12, the differential amplifier 14, and the differential amplifier 15.

In the optical disk device of FIG. 16, a summing amplifier 31 is coupled to the photodiodes "c" and "d" of the photo-detector 9, and a summing amplifier 32 is coupled to the photodiodes "e" and "f" of the photodetector 10. The summing amplifier 31 outputs a sum signal S1s which indicates a sum of the signal output by the photodiode "c" and the signal output by the photodiode "d". The summing amplifier 32 outputs a sum signal S2s which indicates a sum of the signal output by the photodiode "e" and the signal output by the photodiode "f".

Further, a differential amplifier 35 is coupled to the amplifier 31 and the amplifier 32. The differential amplifier 35 outputs a signal (S1s–S2s) which indicates a difference between the sum signal Sis output by the amplifier 31 and the sum signal S2s output by the amplifier 32. A coefficient amplifier 36 is coupled to the differential amplifier 35. The coefficient amplifier 35 outputs a signal k"(S1s–S2s) which indicates a multiplication of the signal (S1s–S2s) from the amplifier 35 by a coefficient "k"". The coefficient k" is a predetermined value which is appropriate for the optical disk device of the present embodiment. The value of the coefficient k" is determined in accordance with the ratio of the quantity of the main-spot reflection beam to the quantity of the sub-spot reflection beam, and the degree of the influence of the recorded track and the non-recorded track on the optical disk.

Further, a summing amplifier 37 is coupled to the amplifier 12 and the amplifier 36. The summing amplifier 37 outputs a signal (Md+k"(S1s–S2s)) which indicates a sum of the push-pull signal Md from the amplifier 12 and the signal k"(S1s–S2s) from the amplifier 36. The use of the coefficient k" allows the amplitude of the signal k"(S1s–S2s) to be nearly equal to the amplitude of the push-pull signal Md, and it makes the signal (Md+k"(S1s–S2s)) effective. The signal (Md +k"(S1s–S2s)) output by the summing amplifier 37 is used as the tracking error signal TE of the optical disk device of the present embodiment.

When the main spot Bm is on the non-recorded track of the optical disk 6, as shown in FIG. 15, the data pits 28 are already on the inner recorded track and no data pits 28 are on the outer non-recorded track. As shown in FIG. 17A, the push-pull signal Md has an offset component (which is indicated by a dotted line in FIG. 17A) due to the influence of the inner recorded track (with the data pits 28 thereon) and the outer non-recorded track (with no data pits 28 thereon).

The arrangement of the sub-spots Bs1 and Bs2 on the optical disk 6 in FIG. 15 is opposite to that of the sub-spots Bs1 and Bs2 in FIG. 12. The sub-spot Bs1 is between the center line of the outer non-recorded track (with no data pits 28 thereon) and the center line of the non-recorded track (with no data pits 28 thereon) of the main spot Bm. As shown in FIG. 17B, the sum signal S1s at the output of the amplifier 31 has no offset component. However, the sub-spot Bs2 is between the center line of the inner recorded track (with the data pits 28 thereon) and the center line of the non-recorded track (with no data pits 28 thereon) of the main spot Bm. As shown in FIG. 17C, the sum signal S2s at the output of the amplifier 32 has an offset component (indicated by a dotted line in FIG. 17C).

Figure 17D:
Figure 17E:
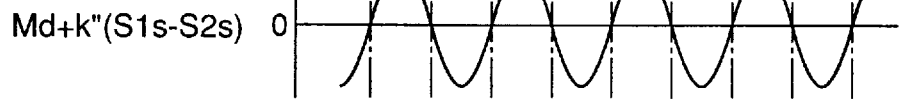

The phase of the sum signal S1s and the phase of the sum signal S2s are the same, and the difference signal (S1s–S2s) includes only the offset component indicated by a dotted line in FIG. 17D. The offset component of the difference signal (S1s–S2s) in FIG. 17D is made in a direction opposite to the direction of the offset component of the push-pull signal Md in FIG. 17A. When the difference signal (S1s–S2s) is produced, the sinusoidal signal components of both Sis and S2s are canceled by each other.

Since the tracking error signal TE is produced by the sum of the push-pull signal Md and the signal k"(S1s–S2s), the offset components of both are canceled as shown in FIG. 17E. Thus, the tracking error signal TE has no offset component, and the tracking error signal TE is used by the tracking control unit 18 of the optical disk device of the present embodiment to correctly carry out the tracking servo control.

In the above-described embodiment, the tracking error signal generating unit includes a second offset eliminating unit 38 which eliminates the above-mentioned offset component from the tracking error signal TE. The summing amplifiers 31 and 32, the differential amplifier 35, the coefficient amplifier 36, and the summing amplifier 37 constitute the second offset eliminating unit 38 of the present embodiment.

The track crossing signal generating unit of the above-described embodiment is the same as that of the optical disk device of FIG. 7B; that is, it is constituted by the differential amplitudes 14, 15 and 16 in FIG. 16. The signal (S1d–S2d) at the output of the differential amplifier 16 is used as the track crossing signal TC of the optical disk device of the present embodiment.

It is possible for the optical disk tracking method and the optical disk device of the present embodiment to produce a stable tracking error signal and a stable track crossing signal with a high level of accuracy in order to carry out the tracking servo control of the optical disk. Further, it is possible for the present embodiment to effectively prevent the tracking error signal from having an offset component due to the influence of a recorded track and a non-recorded track on the optical disk.

Figure 18:
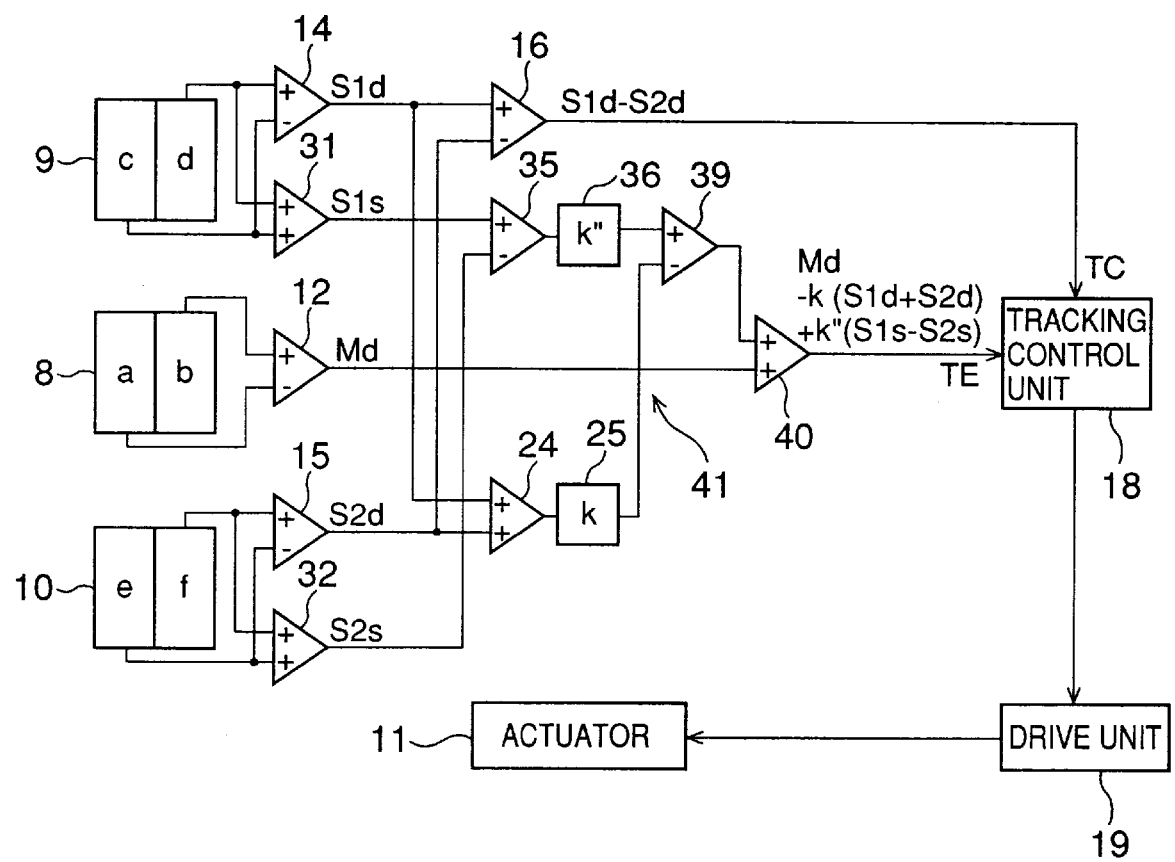
FIG. 18 is a block diagram showing another embodiment of the optical disk device of the present invention.

FIG. 18 shows another embodiment of the optical disk device of the present invention. In FIG. 18, the elements which are the same as corresponding elements FIG. 16 are designated by the same reference numerals, and a description thereof will be omitted.

In the optical disk device of the embodiment of FIG. 18, the main spot Bm and the sub-spots Bs1 and Bs2 are placed on the optical disk 6 in the same manner as shown in FIG. 15.

The optical disk device of FIG. 18 includes all the elements that are the same as the corresponding elements in FIG. 16; that is, they includes: the optical system, the differential amplifier 12, the differential amplifier 14, the differential amplifier 15, the differential amplifier 16, the summing amplifier 31, the summing amplifier 32, the differential amplifier 35, and the coefficient amplifier 36. Further, the optical disk device of FIG. 18 includes the summing amplifier 24 and the coefficient amplifier 25 which are the same as the corresponding elements in FIG. 10. A description of these elements of the optical disk device of FIG. 18 will be omitted.

Further, in the optical disk device of FIG. 18, a differential amplifier 39 is coupled to the coefficient amplifier 36 and the coefficient amplifier 25. The differential amplifier 39 output a signal (k"(S1s–S2s) k(S1d+S2d)) which indicates a difference between the signal k"(S1s–S2s) from the amplifier 36 and the signal k(S1d+S2d) from the amplifier 25. A summing amplifier 40 is coupled to the amplifier 39 and the amplifier 12. The summing amplifier 40 outputs a signal (Md–k(S1d+S2d)+k"(S1s–S2s)) which indicates a sum of the push-pull signal Md from the amplifier 12 and the signal (k"(S1s–S2s)–k(S1d+S2d)) from the amplifier 39.

The use of the coefficient k" and the coefficient k allows the amplitude of the signal k"(S1s–S2s) and the amplitude of the signal k(S1d+S2d) to be nearly equal to the amplitude of the push-pull signal Md, and it makes the signal (Md–k (S1d+S2d)+k"(S1s–S2s)) effective. The signal (Md–k(S1d+ S2d)+k"(S1s–S2s)) output by the differential amplifier 40 is used as the tracking error signal TE of the optical disk device of the present embodiment.

Since the tracking error signal TE in the above-described embodiment is produced by the sum of the push-pull signal Md and the signal (k"(S1s–S2s)–k(S1d +S2d)), the offset components of both are canceled by each other, similarly to the tracking error signal shown in FIG. 17E. Thus, the tracking error signal TE has no offset component, and the tracking error signal TE is used by the tracking control unit 18 of the optical disk device of the present embodiment to correctly carry out the tracking servo control.

In the above-described embodiment, the tracking error signal generating unit includes a third offset eliminating unit 41 which eliminates both the offset component due to the influence of an optical axis deviation or an optical disk inclination and the offset component due to the influence of a recorded track and a non-recorded track on the optical disk, from the tracking error signal TE. The summing amplifiers 24 and 40, the differential amplifiers 35 and 39, and the coefficient amplifiers 25 and 36 constitute the third offset eliminating unit 41 of the present embodiment.

The track crossing signal generating unit of the above-described embodiment is the same as that of the optical disk device of FIG. 7B; that is, it is constituted by the differential amplitudes 14, 15 and 16 in FIG. 16. The signal (S1d–S2d) at the output of the differential amplifier 16 is used as the track crossing signal TC of the optical disk device of the present embodiment.

It is possible for the optical disk tracking method and the optical disk device of the present embodiment to produce a stable tracking error signal and a stable track crossing signal with a high level of accuracy in order to carry out the tracking servo control of the optical disk. Further, it is possible for the present embodiment to effectively prevent the tracking error signal from having offset components due to the influence of an optical axis deviation or an optical disk inclination and due to the influence of a recorded track and a non-recorded track on the optical disk.

FIGS. 19A through 19D and FIG. 20 show a further embodiment of the optical disk device of the present invention.

As shown in FIGS. 19A and 19B, in the optical disk device of the present embodiment, the optical disk 6 has tracks formed with alternate lands L and grooves G on a surface of the disk 6, the lands L and the grooves G having a substantially equal width in a radial direction X of the disk 6. That is, a radial width WG of one of the grooves G is substantially equal to a radial width WL of one of the lands L.

Similarly to the previous embodiment of FIG. 7A, the optical system of the optical disk device of the present embodiment includes the diffraction grating 3 and the objective lens 5. The diffraction grating 3 converts a beam of laser light emitted by the laser light source 1 into a main beam and a pair of sub-beams symmetrical with respect to the main beam.

The objective lens 5 of the optical system of the present embodiment places a main spot Bm on the disk 6 by the main beam and a pair of sub-spots Bs1 and Bs2 on the disk 6 by the sub-beams such that, when the main spot Bm is on a center line of one of the tracks, the sub-spot Bs1 is between the center line of the track of the main spot Bm and a boundary between the track (the middle groove G in FIG. 19B) of the main spot Bm and an adjacent inner track (the adjacent inner land L in FIG. 19B), and the sub-spot Bs2 is between the center line of the track of the main spot and a boundary between the track (the middle groove G in FIG. 19B) of the main spot Bm and an adjacent outer track (the adjacent outer land L in FIG. 19B).

More specifically, in the optical system of the present embodiment, the main spot Bm and the sub-spots Bs1 and Bs2 are placed on the optical disk 6 such that each of a radial distance "Id" between the center of the main spot Bm and the center of one of the sub-spots Bs1 and Bs2 and a radial distance "d" between the center of the main spot Bm and the center of the other sub-spot is represented by the equation:

$$d = WT/4 + WT \cdot m/2$$

where m is a given integer and WT is a radial distance between two adjacent tracks of the disk 6.

In the embodiment of FIGS. 19A and 19B, the integer m is equal to zero, and each of the radial distance d between the center of the main spot Bm and the center of the sub-spot Bs1 and the radial distance d between the center of the main spot Bm and the center of the sub-spot Bs2 is equal to one-fourth of the radial distance WT between two adjacent tracks of the disk 6.

Figure 20:
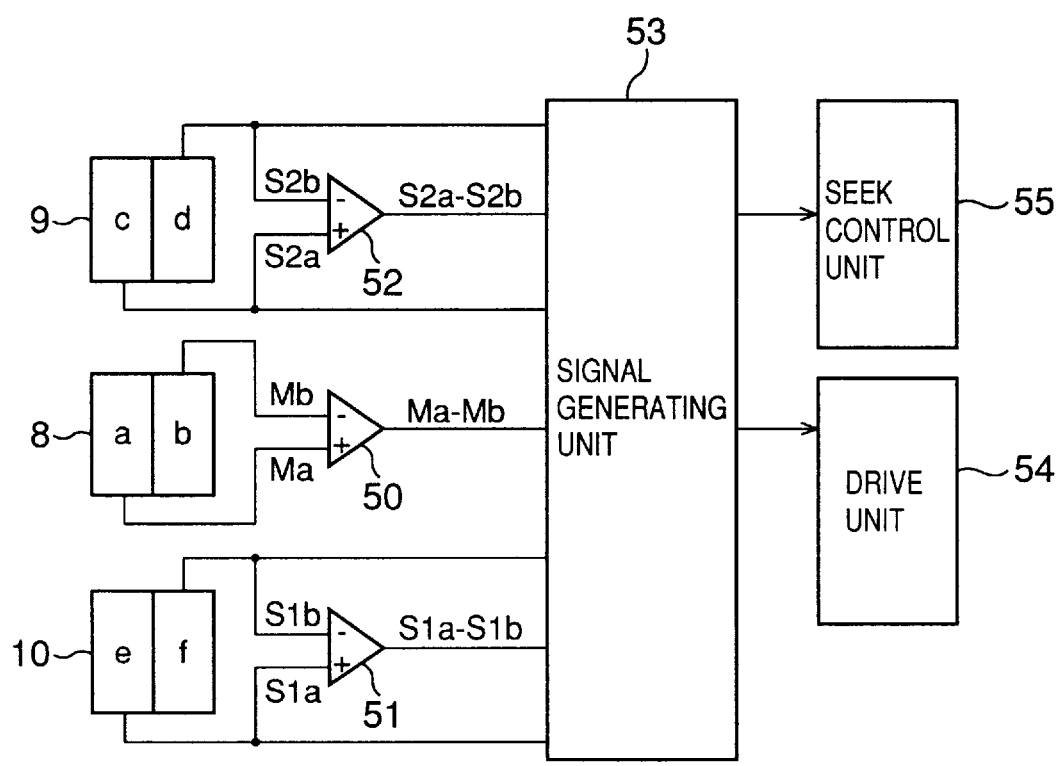
FIG. 20 is a block diagram showing the optical disk device of FIGS. 19A through 19D.

FIG. 20 shows a tracking control unit of the optical disk device of the present embodiment.

As shown in FIG. 20, the main photodetector 8 includes the two equal photodiodes "a" and "b" which are aligned in the radial direction X of the disk 6. The sub-photodetector 9 includes the two equal photodiodes "c" and "d" which are aligned in the radial direction X of the disk 6. The sub-photodetector 10 includes the two equal photodiodes "e" and "f" which are aligned in the radial direction X of the optical disk 6.

A differential amplifier 50 is coupled to the photodiodes "a" and "b" of the main photodetector 8. The differential amplifier 50 outputs a push-pull signal (Ma–Mb) which indicates a difference between a signal Ma output by the photodiode "a" and a signal Mb output by the photodiode "b".

A differential amplifier 51 is coupled to the photodiodes "e" and "f" of the sub-photodetector 10. The differential amplifier 51 outputs a push-pull signal (S1a–S1b) which indicates a difference between a signal S1a output by the photodiode "e" and a signal S1b output by the photodiode "f".

A differential amplifier 52 is coupled to the photodiodes "c" and "d" of the sub-photodetector 9. The differential amplifier 52 outputs a push-pull signal (S2a–S2b) which indicates a difference between a signal S2a output by the photodiode "c" and a signal S2b output by the photodiode "d".

Further, in the optical disk device of the present embodiment, a signal generating unit 53 is coupled to each of the differential amplifiers 50, 51 and 52 and each of the photodiodes "c", "d", "e" and "f". The signal generating unit 53 constitutes a tracking error signal generating unit and a track crossing signal generating unit in the present embodiment.

In the present embodiment, the signal generating unit 53 produces a tracking error signal TE based upon the push-pull signal (Ma–Mb), the push-pull signals (S1a–S1b) and (S2a–S2b), and the signals S1a, S1b, S2a and S2b when the main spot Bm is tracked to one of the tracks of the disk 6. Further, the signal generating unit 53 produces a track crossing signal TC based upon the push-pull signals (S1a–S1b) and (S2a–S2b) and the signals S1a, S1b, S2a and S2b when the main spot Bm crosses one of the tracks of the disk 6.

As shown in FIG. 20, a drive unit 54 is coupled to the signal generating unit 53. A lens actuator (not shown) is coupled to the drive unit 54. The drive unit 54 controls the lens actuator in accordance with the tracking error signal output by the signal generating unit 53. Further, as shown in FIG. 20, a seek control unit 55 is coupled to the signal generating unit 53. A head seeking unit (not shown) is coupled to the seek control unit 55. The seek control unit 55 controls the head seeking unit in accordance with the track crossing signal output by the signal generating unit 53.

Figure 21:
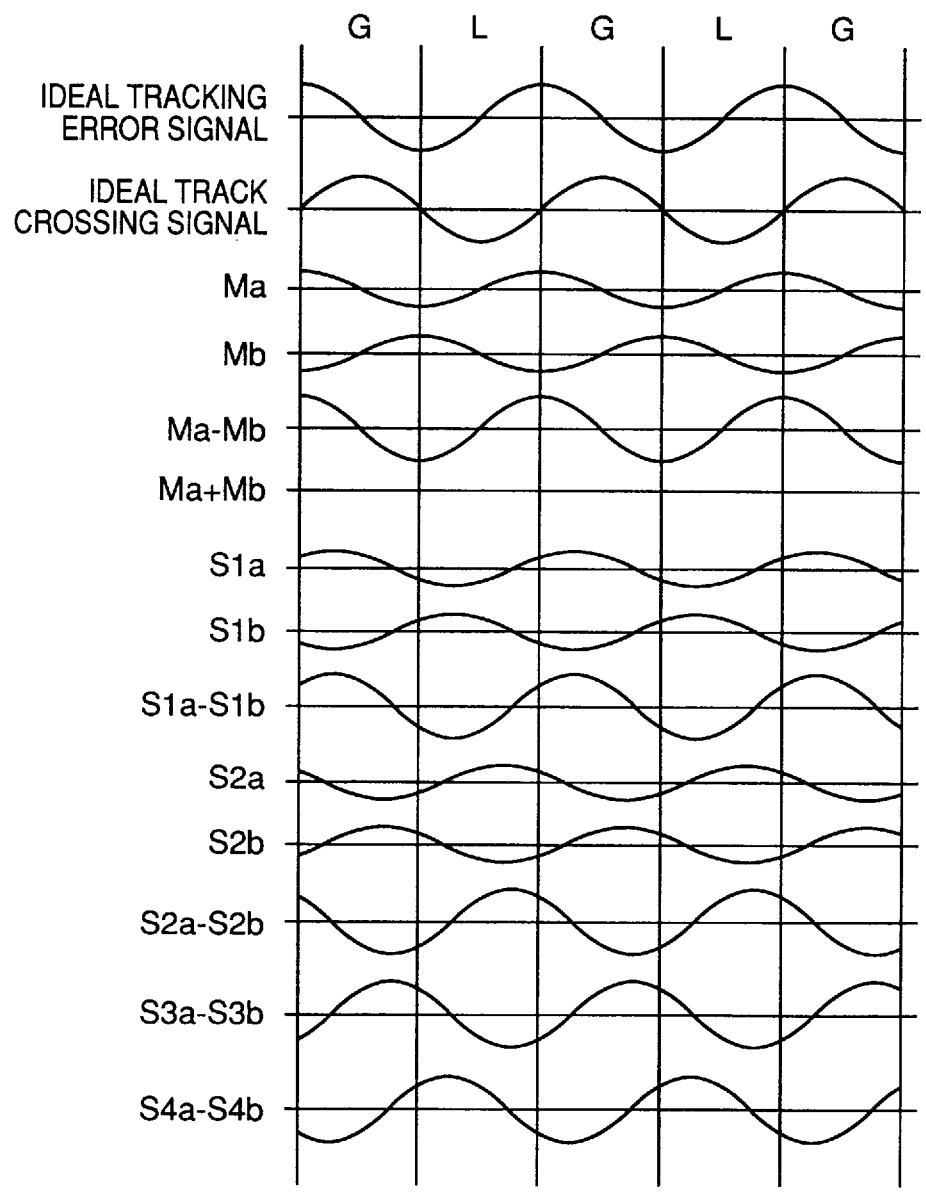
FIG. 21 is a timing chart for explaining signals produced by the optical disk device of FIG. 20.

FIG. 21 shows the signals produced by the optical disk device of FIG. 20. In FIG. 21, the signals Ma and Mb output by the photodiodes "a" and "b" of the main photodetector 8, the signals S1a and S1b output by the photodiodes "e" and "f" of the sub-photodetector 10, and the signals S2a and S2b output by the photodiodes "c" and "d" of the sub-photodetector 9 are shown. The push-pull signal (Ma–Nb) output by the amplifier 50, the push-pull signal (S1a–S1b) output by the amplifier 51, and the push-pull signal (S2a–S2b) output by the amplifier 5 2 are also shown in FIG. 21.

Further, in FIG. 21, an ideal tracking error signal and an ideal track crossing signal, which are accurately produced with no offset component, are shown.

More specifically, the signal generating unit 53 of the embodiment of FIG. 20 produces a tracking error signal TE in accordance with one of the following equations:

$$TE = Ma - Mb + k(S1a + S2a)$$

$$TE = Ma - Mb + k(S1a - S2b)$$

$$TE = Ma - Mb + k(S1b + S2b)$$

$$TE = Ma - Mb + k(S1b - S2a)$$

$$TE = Ma - Mb + k(S1a - S1b) + k'(S2a - S2b)$$

where k and k' are predetermined coefficients.

Further, the signal generating unit 53 of the embodiment of FIG. 20 produces a track crossing signal TC in accordance with one of the following equations:

$$TC = S1a + S2b$$

$$TC = S1a - S2a$$

$$TC = S1b + S2a$$

$$TC = S1b - S2b$$

$$TC = S1a - S1b - j(S2a - S2b)$$

where j is a predetermined coefficient.

Typically, in the optical disk device of the embodiment of FIG. 20, the signal generating unit 53 produces a tracking error signal TE in accordance with the equation: TE=Ma–Mb+k(S1a–S1b)+k'(S2a–S2b). This tracking error signal TE is shown in the upper half of FIG. 19C. Further, the signal generating unit 53 of the present embodiment produces a track crossing signal TC in accordance with the equation: TC=S1a–S1b–j(S2a–S2b). This track crossing signal TC is shown in the lower half of FIG. 19C.

As shown in FIG. 21, the waveform of the push-pull signal (Ma–Mb) output in response to the main spot reflection beam by the differential amplifier 50 is similar to the waveform of the ideal tracking error signal. Thus, the push-pull signal (Ma−Mb) may be used as the tracking error signal TE. However, in a case of an optical disk having a high recording density like the optical disk 6, the amplitude of the push-pull signal (Ma −Mb) is too small to be suitably used as the tracking error signal TE.

In the above-described embodiment, the tracking error signal TE is, as shown in FIG. 19C, produced by a sum of the push-pull signal (Ma−Mb) from the amplifier 50 and the push-pull signals (S1a−S1b) and (S2a−S2b) from the amplifiers 51 and 52. Therefore, the amplitude of the tracking error signal TE becomes sufficiently great, and the optical disk device of the present embodiment can carry out a tracking control with a high level of accuracy.

In the above-described embodiment, the track crossing signal TC is, as shown in FIG. 19C, produced by a difference between the push-pull signal (S1a−S1b) from the amplifier 51 and the push-pull signal (S2a−S2b) from the amplifier 52. Therefore, the amplitude of the track crossing signal TC becomes sufficiently large, and the optical disk device of the present embodiment can carry out a seeking control with a high level of accuracy.

In a conventional differential push-pull method, the sum signal (Ma+Mb) produced in response to the main spot reflection beam is used as the track crossing signal TC. However, in the case of the optical disk in which the lands and the grooves have a substantially equal width in a radial direction of the disk like the optical disk 6, it is difficult to produce a track crossing signal TC based upon the sum signal (Ma+Mb). As shown in FIG. 21, the sum signal (Ma+Mb) becomes zero in the case of the optical disk 6.

Suppose that the letter A and the letter B are substituted for the push-pull signal (S1a−S1b) and the push-pull signal (S2a−S2b) which are produced in response to the sub-spot reflection beams. The tracking error signal TE and the track crossing signal TC in the above-described embodiment are represented by $$TE=Ma-Mb+kA+k'B$$

$$TC=A-jB.$$

If the coefficients k, k' and j are equal to one ("1"), the amplitude of the tracking error signal TE reflects the amplitude of the signal (A+B), and the amplitude of the track crossing signal TC reflects the amplitude of the signal (A−B).

Figure 22:
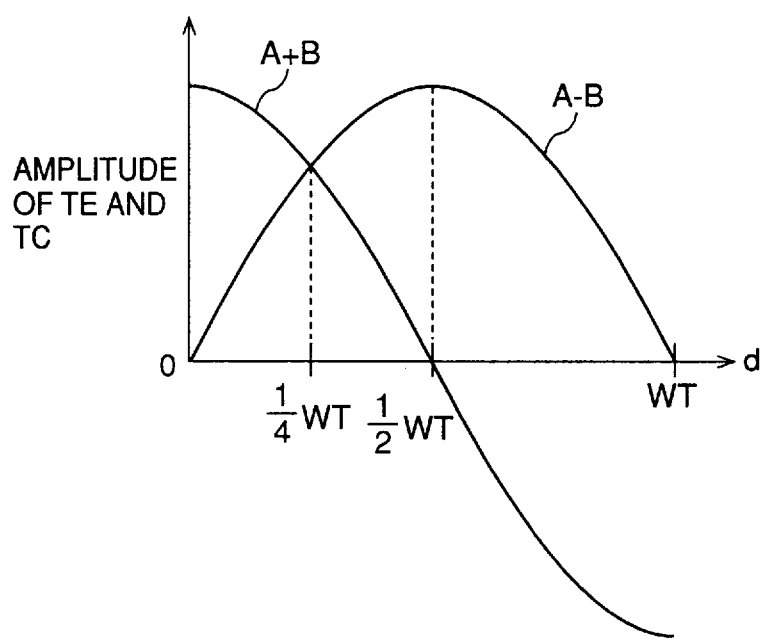
FIG. 22 is a diagram for explaining the amplitude of the tracking error signal and the amplitude of the track crossing signal produced by the optical disk device of FIG. 20.

When the ratio of the radial distance "d" (between the center of the main spot Bm and the center of one of the sub-spots Bs1 and Bs2) to the radial distance "WT" (between two adjacent tracks of the disk 6) is changed, the amplitude of the signal (A+B) and the amplitude of the signal (A−B) are changed as shown in FIG. 22.

As shown in FIG. 22, when the amplitude of the signal (A+B) is locally maximum, the amplitude of the signal (A−B) is zero. Conversely, when the amplitude of the signal (A+B) is zero, the amplitude of the signal (A−B) is locally maximum.

In the case of the conventional differential push-pull method, the radial distance d is equal to the radial distance WT. When the tracking of the optical disk 6 is performed by using the conventional differential push-pull method, the amplitude of the tracking error signal TE is maximum and the amplitude of the track crossing signal TC is zero.

In the case of the conventional three-beam method, the radial distance d is half the radial distance WT. When the tracking of the optical disk 6 is performed by using the conventional three-beam method, the amplitude of the tracking error signal TE is zero and the amplitude of the track crossing signal TC is maximum.

As described above, in the optical disk device of the embodiment of FIGS. 19A and 19B, the radial distance d is equal to one-fourth of the radial distance WT. As shown in FIG. 22, in the present embodiment, both the amplitude of the tracking error signal TE and the amplitude of the track crossing signal TC are sufficiently great. Therefore, it is possible for the optical disk device of the present embodiment to produce a stable tracking error signal and a stable track crossing signal with a high level of accuracy.

It is conceivable that the radial distance "d" be determined in accordance with the above equation d =WT/4+WT+.m/2 and "m" be set to a non-zero integer. The objective lens 5 of the optical system in this case places the main spot and the sub-spots on a middle track and two adjacent tracks of the optical disk 6 in a manner different from the embodiment of FIG. 19B. The push-pull signals (S3a−S3b) and (S4a−S4b) produced in response to the sub-spot reflection beams by the amplifiers 51 and 52 in such a case are also shown in FIG. 21. As shown, the push-pull signal (S3a−S3b) is the inverted one of the push-pull signal (S1a−S1b), and the push-pull signal (S4a−S4b) is the inverted one of the push-pull signal (S2a−S2b). If the integer "m" of the equation to determine the radial distance "d" is changed to a non-zero integer, the sign (positive or negative) of the coefficient "k" or "k'" of the equation to determine the tracking error signal TE is changed to the reverse one.

In the above-described embodiment, the signal generating unit 53 may produce a tracking error signal TE in accordance with the equation TE=Ma−Mb+k(S1a+S2a) and produce a track crossing signal TC in accordance with the equation TC=S1a+S2b. The waveform of the tracking error signal TE and the waveform of the track crossing signal TC are shown in FIG. 19D. In this case, the signals from the photodiodes "d" and "f" and the signals from the sub-photodetectors 51 and 52 are not used to produce the tracking error signal TE and the track crossing signal TC. Thus, in this case, the photodiodes "d" and "f" and the sub-photodetectors 51 and 52 may be omitted from the embodiment of FIG. 20, and the optical disk device may have a simple structure.

It is apparent from FIGS. 19C and 19D that the amplitudes of the signals TE and TC vary depending upon whether all the signals produced by the optical disk device are used or those signals are partially used. It is desirable that one of the above equations to determine the tracking error signal TE and one of the above equations to determine the track crossing signal TC which are most suitable for an operating condition of the optical disk device be selected. For example, when data is recorded onto one of the tracks of the optical disk 6 by using the main spot Bm and the sub-spot Bs1 or Bs2 should not be placed on the track of the main spot Bm, it is most suitable to select the equation TE=Ma−Mb+k(S1a−S2b) to produce the tracking error signal TE and select the equation TC=S1a+S2b to produce the track crossing signal TC. In this example, the sub-spots Bs1 and Bs2 are cut by a shielding before they hit the track of the main spot Bm.

In the above-described embodiment, when the spots of the optical disk device cross the boundary area of a recorded track and a non-recorded track on the optical disk, the tracking error signal TE is influenced by the difference in the quantity of light between the reflection beam from the recorded track and the reflection beam from the non-recorded track. As described above, the tracking error signal TE may have an offset component in such a case. The influence of the recorded track and the non-recorded track on the signal TE becomes considerable when the signals produced by the optical disk device are partially used to produce the tracking error signal TE or the track crossing signal TC.

Accordingly, when the signals produced by the optical disk device are partially used and it is desired to eliminate the above-mentioned problem, the signal generating unit 53 of the present embodiment produces respective normalized signals of the push-pull signal (Ma−Mb) and the push-pull signals (S1a−S1b) and (S1a−S2b) by dividing each of Ma and Mb by the sum (Ma+Mb), dividing each of S1a and S1b by the sum (S1a+S1b), and dividing each of S2a and S2b by the sum (S2a+S2b). The normalized signals are not influenced by the difference in the quantity of light. By producing the tracking error signal TE using the normalized signals, it is possible to effectively prevent the tracking error signal TE from having an offset component due to the influence of the recorded track and the non-recorded track on the optical disk.

Further, the present invention is not limited to the above-described embodiments, and variations and modifications may be made without departing from the scope of the present invention.

What is claimed is:

1. A tracking method of an optical disk, the disk having alternate lands and grooves on a surface of the disk, said tracking method comprising steps of:

converting a beam of laser light emitted by a laser light source into a main beam and a pair of sub-beams symmetrical with respect to the main beam;

placing a main spot on the disk by the main beam and a pair of sub-spots on the disk by the sub-beams such that, when the main spot is on a center line of one of the lands and the grooves, one of the sub-spots is between the center line of said one of the lands and the grooves and a center line of an adjacent inner one of the lands and the grooves and the other sub-spot is between the center line of said one of the lands and the grooves and a center line of an adjacent outer one of the lands and the grooves;

producing a first push-pull signal Md from a reflection beam from the main spot on the disk;

producing second push-pull signals S1d and S2d from reflection beams from the sub-spots on the disk;

producing a tracking error signal TE from said first push-pull signal Md and said second push-pull signals S1d and S2d in accordance with the equation: TE=Md−k(S1d+S2d) where k is a predetermined coefficient; and producing a track crossing signal TC from said second push-pull signals S1d and S2d in accordance with the equation TC=S1d−S2d.

2. The method according to claim 1, wherein the lands and the grooves on the surface of the disk have a substantially equal width in a radial direction of the disk.

3. An optical disk device for tracking an optical disk, the disk having alternate lands and grooves on a surface of the optical disk, said optical disk device comprising:

a laser light source;

an optical system having a beam converting unit and an objective lens, said beam converting unit converting a beam of laser light emitted by the laser light source into a main beam and a pair of sub-beams symmetrical with respect to the main beam, and said objective lens placing a main spot on the disk by the main beam and a pair of sub-spots on the disk by the sub-beams such that, when the main spot is on a center line of one of the lands and the grooves, one of the sub-spots is between the center line of said one of the lands and the grooves and a center line of an adjacent inner one of the lands and the grooves and the other sub-spot is between the center line of said one of the lands and the grooves and a center line of an adjacent outer one of the lands and the grooves;

a first unit coupled to two equal first photodiodes for producing a first push-pull signal Md from a reflection beam from the main spot on the disk;

a pair of second units, each coupled to two equal second photodiodes, for producing second push-pull signals S1d and S2d from reflection beams from the sub-spots spots on the disk respectively;

a tracking error signal generating unit for producing a tracking error signal TE from said first push-pull signal Md and said second push-pull signals S1d and S2d in accordance with the equation: TE=Md−k(S1d+S2d) where k is a predetermined coefficient; and a track crossing signal generating unit for producing a track crossing signal TC from said second push-pull signals S1d and S2d in accordance with the equation TC=S1d−S2d.

4. The optical disk device according to claim 3, wherein the lands and the grooves on the surface of the disk have a substantially equal width in a radial direction of the disk.

5. A tracking method of an optical disk, the disk having alternate lands and grooves on a surface of the optical disk, wherein data is recorded onto the lands and the grooves of the disk in an alternate manner when the disk is rotated, said tracking method comprising steps of:

converting a beam of laser light emitted by a laser light source into a main beam and a pair of sub-beams symmetrical with respect to the main beam;

placing a main spot on the disk by the main beam and a pair of sub-spots on the disk by the sub-beams, such that the sub-spots include a preceding sub-spot and a following sub-spot with respect to a disk rotating direction, and, when the main spot is on a center line of one of the lands and the grooves, the preceding one of the sub-spots is between the center line of said one of the lands and the grooves and a center line of an adjacent inner one of the lands and the grooves and the following one of the sub-spots is between the center line of said one of the lands and the grooves and a center line of an adjacent outer one of the lands and the grooves;

producing a first push-pull signal Md from a reflection beam from the main spot on the disk;

producing second push-pull signals S1d and S2d from reflection beams from the sub-spots on the disk;

producing a tracking error signal TE from said first push-pull signal Md and said second push-pull signals S1d and S2d in accordance with the equation: TE=Md−k'(S1d+S2d) where k' is a predetermined coefficient; and producing a track crossing signal TC from said second push-pull signals S1d and S2d in accordance with the equation TC=S1d−S2d.

6. The method according to claim 5, wherein the lands and the grooves on the surface of the disk have a substantially equal width in a radial direction of the disk.

7. An optical disk device for tracking an optical disk, the disk having alternate lands and grooves on a surface of the optical disk, wherein data is recorded onto the lands and the grooves of the disk in an alternate manner when the disk is rotated, said optical disk device comprising:

a laser light source;

an optical system having a beam converting unit and an objective lens, said beam converting unit converting a beam of laser light emitted by the laser light source into a main beam and a pair of sub-beams symmetrical with respect to the main beam, and said objective lens placing a main spot on the disk by the main beam and a pair of sub-spots on the disk by the sub-beams, such that the sub-spots include a preceding sub-spot and a following sub-spot with respect to a disk rotating direction, and, when the main spot is on a center line of one of the lands and the grooves, the preceding one of the sub-spots is between the center line of said one of the lands and the grooves and a center line of an adjacent inner one of the lands and the grooves and the following one of the sub-spots is between the center line of said one of the lands and the grooves and a center line of an adjacent outer one of the lands and the grooves;

a first unit coupled to two equal first photodiodes for producing a first push-pull signal Md from a reflection beam from the main spot on the disk;

a pair of second units, each coupled to two equal second photodiodes, for producing second push-pull signals S1d and S2d from reflection beams from the sub-spots on the disk respectively;

a tracking error signal generating unit for producing a tracking error signal TE from said first push-pull signal Md and said second push-pull signals S1d and S2d in accordance with the equation: TE=Md−k1(S1d+S2d) where k' is a predetermined coefficient; and a track crossing signal unit for producing a track crossing signal TC from said second push-pull signals S1d and S2d in accordance with the equation TC=S1d−S2d.

8. The optical disk device according to claim 7, wherein the lands and the grooves on the surface of the disk have a substantially equal width in a radial direction of the disk.

9. A tracking method of an optical disk, the disk having alternate lands and grooves on a surface of the optical disk, wherein data is recorded onto the lands and the grooves of the disk in an alternate manner when the disk is rotated, said tracking method comprising steps of:

converting a beam of laser light emitted by a laser light source into a main beam and a pair of sub-beams symmetrical with respect to the main beam;

placing a main spot on the disk by the main beam and a pair of sub-spots on the disk by the sub-beams, such that the sub-spots include a preceding sub-spot and a following sub-spot with respect to a disk rotating direction, and, when the main spot is on a center line of one of the lands and the grooves, the following one of the sub-spots is between the center line of said one of the lands and the grooves and a center line of an adjacent inner one of the lands and the grooves and the preceding one of the sub-spots is between the center line of said one of the lands and the grooves and a center line of an adjacent outer one of the lands and the grooves;

producing a first push-pull signal Md from a reflection beam from the main spot on the disk;

producing second push-pull signals S1d and S2d from reflection beams from the sub-spots on the disk;

producing sum signals S1s and S2s from the reflection beams from the sub-spots on the disk;

producing a tracking error signal TE from said first push-pull signal Md and said sum signals S1s and S2s in accordance with the equation: TE=Md+k"(S1s −S2s) where k" is a predetermined coefficient; and producing a track crossing signal TC from said second push-pull signals S1d and S2d in accordance with the equation TC=S1d−S2d.

10. The method according to claim 9, wherein the lands and the grooves on the surface of the disk have a substantially equal width in a radial direction of the disk.

11. An optical disk device for tracking an optical disk, the disk having alternate lands and grooves on a surface of the optical disk, wherein data is recorded onto the lands and the grooves of the disk in an alternate manner when the disk is rotated, said optical disk device comprising:

a laser light source;

an optical system having a beam converting unit and an objective lens, said beam converting unit converting a beam of laser light emitted by the laser light source into a main beam and a pair of sub-beams symmetrical with respect to the main beam, and said objective lens placing a main spot on the disk by the main beam and a pair of sub-spots on the disk by the sub-beams, such that the sub-spots include a preceding sub-spot and a following sub-spot with respect to a disk rotating direction, and, when the main spot is on a center line of one of the lands and the grooves, the following one of the sub-spots is between the center line of said one of the lands and the grooves and a center line of an adjacent inner one of the lands and the grooves and the preceding one of the sub-spots is between the center line of said one of the lands and the grooves and a center line of an adjacent outer one of the lands and the grooves;

a first unit coupled to two equal first photodiodes for producing a first push-pull signal Md from a reflection beam from the main spot on the disk;

a pair of second units, each coupled to two equal second photodiodes, for producing second push-pull signals S1d and S2d from reflection beams from the sub-spots on the disk respectively;

a pair of third units, each coupled to said two equal second photodiodes, for producing sum signals S1s and S2s from the reflection beams from the sub-spots on the disk respectively;

a tracking error signal generating unit for producing a tracking error signal TE from said first push-pull signal Md and said sum signals S1s and S2s in accordance with the equation: TE=Md+k"(S1s−S2s) where k" is a predetermined coefficient; and a track crossing signal generating unit for producing a track crossing signal TC from said second push-pull signals S1d and S2d in accordance with the equation TC=S1d−S2d.

12. The optical disk device according to claim 11, wherein the lands and the grooves on the surface of the disk have a substantially equal width in a radial direction of the disk.

13. A tracking method of an optical disk, the disk having alternate lands and grooves on a surface of the optical disk, wherein data is recorded onto the lands and the grooves of the disk in an alternate manner when the disk is rotated, said tracking method comprising steps of:

converting a beam of laser light emitted by a laser light source into a main beam and a pair of sub-beams symmetrical with respect to the main beam;

placing a main spot on the disk by the main beam and a pair of sub-spots on the disk by the sub-beams, such that the sub-spots include a preceding sub-spot and a following sub-spot with respect to a disk rotating direction, and, when the main spot is on a center line of one of the lands and the grooves, the following one of the sub-spots is between the center line of said one of the lands and the grooves and a center line of an adjacent inner one of the lands and the grooves and the preceding one of the sub-spots is between the center line of said one of the lands and the grooves and a center line of an adjacent outer one of the sands and the grooves;

producing a first push-pull signal Md from a reflection beam from the main spot on the disk;

producing second-push-pull signals S1d and S2d from reflection beams from the sub-spots on the disk;

producing sum signals S1s and S2s from the reflection beams from the sub-spots on the disk;

producing a tracking error signal TE from said first push-pull signal Md, said second push-pull signals S1d and S2d and said sum signals S1s and S2s in accordance with the equation: TE=Md−k(S1d+S2d)+k"(S1s−S2s) where k and k" are predetermined coefficients; and producing a track crossing signal TC from said second push-pull signals S1d and S2d in accordance with the equation TC=S1d−S2d.

14. The method according to claim 13, wherein the lands and the grooves on the surface of the disk have a substantially equal width in a radial direction of the disk.

15. An optical disk device for tracking an optical disk, the disk having alternate lands and grooves on a surface of the optical disk, wherein data is recorded onto the lands and the grooves of the disk in an alternate manner when the disk is rotated, said optical disk device comprising:

a laser light source;

an optical system having a beam converting unit and an objective lens, said beam converting unit converting a beam of laser light emitted by a laser light source into a main beam and a pair of sub-beams symmetrical with respect to the main beam, and said objective lens placing a main spot on the disk by the main beam and a pair of sub-spots on the disk by the sub-beams, such that the sub-spots include a preceding sub-spot and a following sub-spot with respect to a disk rotating direction, and, when the main spot is on a center line of one of the lands and the grooves, the following one of the sub-spots is between the center line of said one of the lands and the grooves and a center line of an adjacent inner one of the lands and the grooves and the preceding one of the sub-spots is between the center line of said one of the lands and the grooves and a center line of an adjacent outer one of the lands and the grooves;

a first unit coupled to two equal first photodiodes for producing a first push-pull signal Md from a reflection beam from the main spot on the disk;

a pair of second units, each coupled to two equal second photodiodes, for producing second push-pull signals S1d and S2d from reflection beams from the sub-spots on the disk;

a pair of third units, each coupled to said two equal second photodiodes, for producing sum signals S1s and S2s from the reflection beams from the sub-spots on the disk;

a tracking error signal generating unit for producing a tracking error signal TE from said first push-pull signal Md, said second push-pull signals S1d and S2d and said sum signals S1s and S2s in accordance with the equation: TE=Md−k(S1d+S2d)+k"(S1s−S2s) where k and k" are predetermined coefficients; and a track crossing signal generating unit for producing a track crossing signal TC from said second push-pull signals S1d and S2d in accordance with the equation TC=S1d−S2d.

16. The optical disk device according to claim 15, wherein the lands and the grooves on the surface of the disk have a substantially equal width in a radial direction of the disk.

17. An optical disk device for tracking an optical disk, the disk having alternate lands and grooves on a surface of the optical disk, said optical disk device comprising:

a laser light source:

an optical system having a beam converting unit and an objective lens, said beam converting unit converting a beam of laser light emitted by the laser light source into a main beam and a pair of sub-beams symmetrical with respect to the main beam, and said objective lens placing a main spot on the disk by the main beam and a pair of sub-spots on the disk by the sub-beams such that, when the main spot is on a center line of one of the lands and the grooves, one of the sub-spots is between the center line of said one of the lands and the grooves and a boundary between said one of the lands and the grooves and an adjacent inner one of the lands and the grooves and the other sub-spot is between the center line of said one of the lands and the grooves and a boundary between said one of the lands and the grooves and an adjacent outer one of the lands and the grooves;

a first unit coupled to at least two equal first photodiodes for producing first signals from a reflection beam from the main spot on the disk;

a pair of second units, each coupled to at least two equal second photodiodes, for producing second signals from reflection beams from the sub-spots on the disk respectively:

a tracking error signal generating unit for producing a tracking error signal based upon said first signals and said second signals;

a track crossing signal generating unit for producing a track crossing signal based upon said second signals; and wherein each of a radial distance d between the center of the main spot and the center of one of the sub-spots and a radial distance d between the center of the main spot and the center of the other sub-spot is represented by the equation:

$$d = WT/4 + WT \cdot m/2$$

where m is given integer and WT is a radial distance between two adjacent tracks of the disk.

18. An optical disk device for tracking an optical disk, the disk having alternate lands and grooves on a surface of the optical disk, said optical disk device comprising:

a laser light source:

an optical system having a beam converting unit and an objective lens, said beam converting unit converting a beam of laser light emitted by the laser light source into a main beam and a pair of sub-beams symmetrical with respect to the main beam, and said objective lens placing a main spot on the disk by the main beam and a pair of sub-spots on the disk by the sub-beams such that, when the main spot is on a center line of one of the lands and the grooves, one of the sub-spots is between the center line of said one of the lands and the grooves and a boundary between said one of the lands and the grooves and an adjacent inner one of the lands and the grooves and the other sub-spot is between the center line of said one of the lands and the grooves and a boundary between said one of the lands and the grooves and an adjacent outer one of the lands and the grooves:

a first unit coupled to at least two equal first photodiodes for producing first signals from a reflection beam from the main spot on the disk;

a pair of second units, each coupled to at least two equal second photodiodes, for producing second signals from reflection beams from the sub-spots on the disk respectively;

a tracking error signal generating unit for producing a tracking error signal based upon said first signals and said second signals;

a track crossing signal generating unit for producing a track crossing signal based upon said second signals; and wherein said tracking error signal generating unit produces a tracking error signal TE in accordance with one of the following equations:

$$TE=Ma-Mb+k(S1a+S2a)$$

$$TE=Ma-Mb+k(S1a-S2b)$$

$$TE=Ma-Mb+k(S1b+S2b)$$

$$TE=Ma-Mb+k(S1b-S2a)$$

$$TE=Ma-Mb+k(S1a-S1b)+k'(S2a-S2b)$$

where Ma and Mb are signals output by the first photodiodes of the first unit, S1a and S1b are signals output by the second photodiodes of one of the second units, S2a and S2b are signals output by the second photodiodes of the other of the second units, and k and k' are predetermined coefficients.

19. The optical disk device according to claim 18, wherein said tracking error signal generating unit produces respective normalized signals of said first signals and said second signals by dividing each of Ma and Mb by (Ma+Mb), dividing each of S1a and S1b by (S1a+S1b), and dividing each of S2a and S2b by (S2a+S2b).

20. An optical disk device for tracking an optical disk, the disk having alternate lands and grooves on a surface of the optical disk, said optical disk device comprising:

a laser light source;

an optical system having a beam converting unit and an objective lens, said beam converting unit converting a beam of laser light emitted by the laser light source into a main beam and a pair of sub-beams symmetrical with respect to the main beam, and said objective lens placing a main spot on the disk by the main beam and a pair of sub-spots on the disk by the sub-beams such that, when the main spot is on a center line of one of the lands and the grooves, one of the sub-spots is between the center line of said one of the lands and the grooves and a boundary between said one of the lands and the grooves and an adjacent inner one of the lands and the grooves and the other sub-spot is between the center line of said one of the lands and the grooves and a boundary between said one of the lands and the grooves and an adjacent outer one of the lands and the grooves;

a first unit coupled to at least two equal first photodiodes for producing first signals from a reflection beam from the main spot on the disk;

a pair of second units, each coupled to at least two equal second photodiodes, for producing second signals from reflection beams from the sub-spots on the disk respectively;

a tracking error signal generating unit for producing a tracking error signal based upon said first signals and said second signals;

a track crossing signal generating unit for producing a track crossing signal based upon said second signals; and wherein said track crossing signal generating unit produces a track crossing signal TC in accordance with one of the following equations:

$$TC=S1a'S2b$$

$$TC=S1a-S2a$$

$$TC=S1b+S2a$$

$$TC=S1b-S2b$$

$$TC=S1a-S1b-j(S2a-S2b)$$

where S1a and S1b are signals output by the second photodiodes of one of the second units, S2a and S2b are signals output by the second photodiodes of the other of the second units, and j is a determined coefficient.

* * * * *